US012627980B2

(12) United States Patent
Li et al.

(10) Patent No.: US 12,627,980 B2
(45) Date of Patent: May 12, 2026

(54) SYSTEMS AND METHODS FOR SECURE INTERNET-OF-THINGS (IoT) DEVICE TO CLOUD INTEGRATION

(71) Applicant: AT&T Mobility II LLC, Atlanta, GA (US)

(72) Inventors: Dongdong Li, Frisco, TX (US); George Ransom Murphy, Holly Springs, NC (US)

(73) Assignee: AT&T Mobility II LLC, Atlanta, GA (US)

( * ) Notice: Subject to any disclaimer, the term of this patent is extended or adjusted under 35 U.S.C. 154(b) by 343 days.

(21) Appl. No.: 18/355,785

(22) Filed: Jul. 20, 2023

(65) Prior Publication Data

US 2025/0031041 A1     Jan. 23, 2025

(51) Int. Cl.
| | |
|---|---|
| *H04W 12/72* | (2021.01) |
| *H04W 12/08* | (2021.01) |
| *G06F 9/4401* | (2018.01) |
| *G16Y 30/10* | (2020.01) |

(52) U.S. Cl.
CPC ........... *H04W 12/08* (2013.01); *H04W 12/72* (2021.01); *G06F 9/4416* (2013.01); *G16Y 30/10* (2020.01)

(58) Field of Classification Search
CPC ..... H04W 12/08; H04W 12/72; H04W 12/40; G06F 9/4416; G16Y 30/10
USPC ........................................................ 455/411
See application file for complete search history.

(56) References Cited

U.S. PATENT DOCUMENTS

| | | | | |
|---|---|---|---|---|
| 11,076,296 B1 * | 7/2021 | Kant | ...................... | H04W 12/72 |
| 12,099,583 B2 * | 9/2024 | Pagidi | ...................... | H04L 63/10 |
| 2020/0112851 A1 * | 4/2020 | Wane | ...................... | H04W 4/50 |
| 2022/0287151 A1 * | 9/2022 | Howe | ...................... | H04W 8/18 |

OTHER PUBLICATIONS

"AWS IoT Core", Retrieved Jun. 21, 2023, 10 pages.
"Azure IoT Hub", Retrieved Jun. 21, 2023, 10 pages.
"GSMA" IoT SAFE; Internet of Things, Retrieved Jun. 21, 2023, 7 pages.

* cited by examiner

*Primary Examiner* — Don N Vo
(74) *Attorney, Agent, or Firm* — Guntin & Gust, PLC; Bryan S. Latham

(57) ABSTRACT

Aspects of the subject disclosure may include, for example, a device in which a cloud connection stack and a security transport stack are each partially or entirely implemented for execution in a modem (e.g., a cellular modem) or a SIM component (e.g., an IoT SAFE SIM applet) of the device, rather than on the device's own OS and processor. Some or all of the application layer protocols (e.g., MQTT, CoAP, LwM2M, etc.) in the security transport stack may be implemented (or consolidated) for execution by the modem or SIM component. Some or all of the functionality of the cloud connection stack (e.g., bootstrapping and messaging/ telemetry) may additionally, or alternatively, be implemented (or consolidated) for execution by the modem or SIM component. Other embodiments are disclosed.

20 Claims, 20 Drawing Sheets

200a

200b

200c

200d

200e

200f

300

<u>600</u>

SYSTEMS AND METHODS FOR SECURE INTERNET-OF-THINGS (IoT) DEVICE TO CLOUD INTEGRATION

FIELD OF THE DISCLOSURE

The subject disclosure relates to systems and methods for secure Internet-of-Things (IoT) device to cloud integration.

BACKGROUND

Many IoT devices use customized or special purpose security and transport stacks to ensure safe and reliable connectivity. For instance, IoT SAFE devices that are compliant with Global System for Mobile Communications Association (GSMA) IoT SAFE standards employ special security stacks that retrieve and utilize keys/certificates stored in a highly trusted SIM card to securely connect to the cloud. These special security transport stacks are executed within the IoT device's operating system (OS), which runs on the IoT device's (e.g., native) processor. They include rules or protocols for various layers of the Open Systems Interconnection (OSI) model, such as Transport Layer Security (TLS) or Datagram TLS (DTLS) in the network layer to address both security and connection constraints, and Message Queuing Telemetry Transport (MQTT) or Constrained Application Protocol (CoAP) in the application layer to ensure reliable cloud connectivity. A typical IoT SAFE device is also equipped with a cloud connection stack that is similarly executed in the IoT device's OS. This stack includes rules or protocols for establishing and maintaining connections between the device and cloud-based services.

BRIEF DESCRIPTION OF THE DRAWINGS

Reference will now be made to the accompanying drawings, which are not necessarily drawn to scale, and wherein:

FIG. 2O is a block diagram illustrating an alternate example, non-limiting embodiment of an IoT system functioning within, or operatively overlaid upon, the communications network of FIG. 1 in accordance with various aspects described herein.

DETAILED DESCRIPTION

Figure 1:
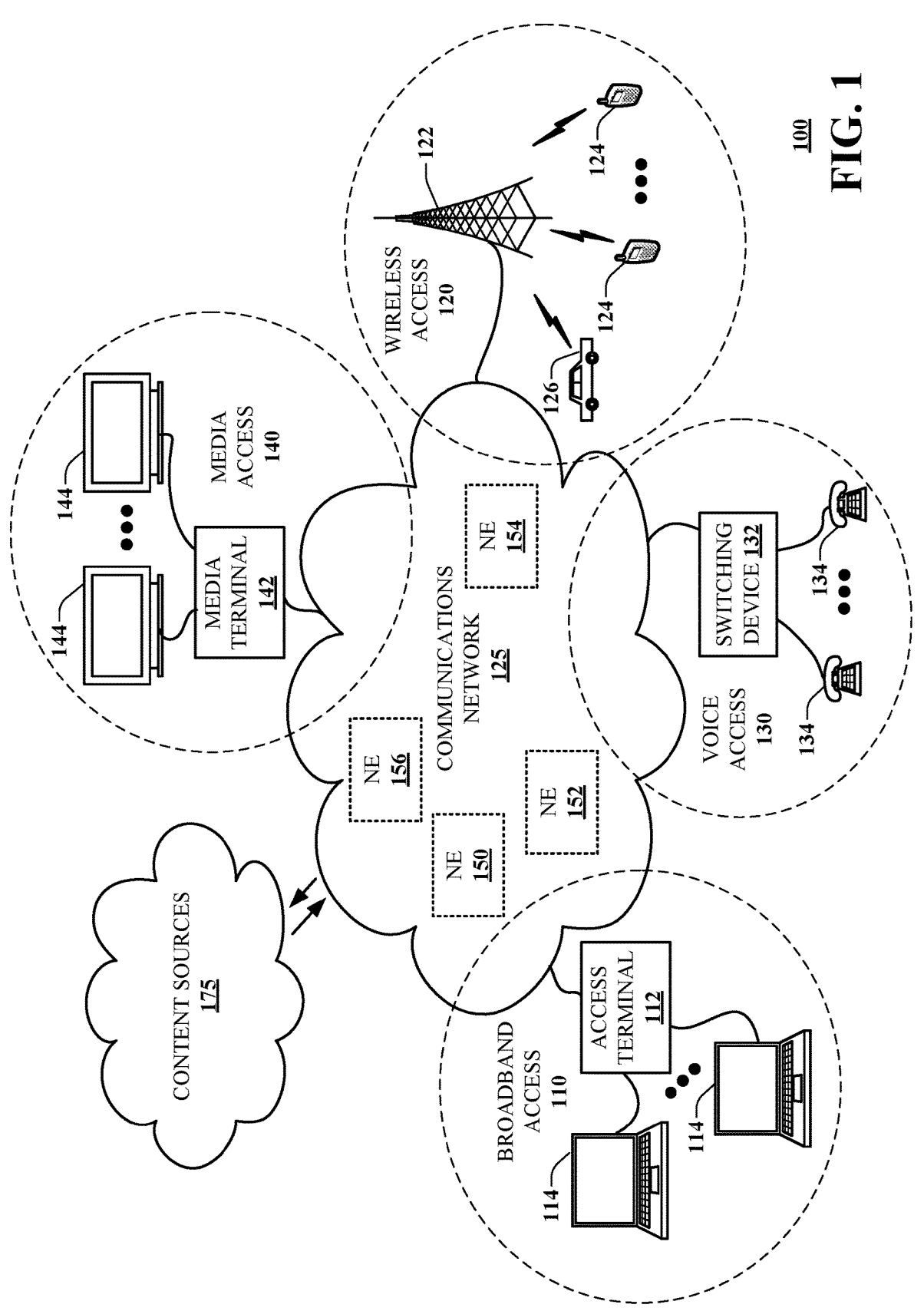
FIG. 1 is a block diagram illustrating an exemplary, non-limiting embodiment of a communications network in accordance with various aspects described herein.

As discussed above, existing IoT SAFE devices require a special security stack that obtains SIM card secrets from a modem to encrypt traffic for the cloud. Constrained and non-constrained IoT devices also run a special transport layer for reliable cloud connectivity. Because these customized or special purpose security and transport stacks run on an IoT device's own OS and processor, they impose additional development and integration requirements on IoT device designers and developers, which limits their ability to quickly bring IoT devices to market. Indeed, they not only need to develop and manage security and transport stacks for cloud communications, but must also modify them to accommodate for any cloud system updates. Furthermore, bootstrapping is often performed in the field by the user/customer, which adds unneeded overhead burden.

The subject disclosure describes, among other things, illustrative embodiments of an IoT device in which the cloud connection stack and the security transport stack are each partially or entirely implemented for execution in a modem (e.g., a cellular modem) or a SIM component (e.g., an IoT SAFE SIM applet) of the IoT device, rather than on the IoT device's own OS and processor. In one or more embodiments, some or all of the application layer protocols (e.g., MQTT, CoAP, Lightweight Machine-to-Machine (LwM2M), etc.) in the security transport stack may be implemented (or consolidated) for execution by the modem or SIM component. In certain embodiments, some or all of the functionality of the cloud connection stack (e.g., bootstrapping and messaging/telemetry) may additionally, or alternatively, be implemented (or consolidated) for execution by the modem or SIM component.

Various possible embodiments/implementations of the IoT device are discussed in more detail below with respect to FIGS. 2A-2O.

Traditional IoT SAFE devices run stacks in the device's own OS, which needs to talk to the modem in order to obtain SIM card secrets for encrypting traffic to the cloud. This involves numerous interfaces and customized solutions, which requires extensive development and integration effort from IoT device vendors. Further, any update to corresponding cloud systems would also require an IoT device vendor to update the security stacks in the IoT device itself. Implementing portions or the entireties of these complex stacks for execution in the modem or SIM component, as described herein, advantageously reduces or eliminates the need for IoT device designers and developers to expend time and resources for configuring and maintaining those stacks. This simplifies IoT device onboarding, provisioning, and maintenance, and allows IoT devices to function "right out of the box" with all of the requisite functions.

Exemplary embodiments of the IoT device implementations described herein may be utilized with any type of IoT connectivity service (e.g., AT&T's IoT CloudConnect or the like) to provide a fast, secure, and easy way to deploy IoT solutions directly to the cloud. Hyperscalers will benefit via faster adoption of cloud usage and opportunities for upselling cloud services (e.g., artificial intelligence (AI), machine learning (ML), etc.). Access to a larger set and variety of IoT devices can also be secured. Additionally, device and modem manufacturers will also benefit from an expanded catalog and expanded distribution as well as lower support costs. Further, system integrators will benefit from faster deployments, lower support/development costs, and quicker realization of revenue.

Enterprise users and IoT device manufacturers/integrators typically require integration with Hyperscalers for various IoT devices on a specific deployment timeframe. The innovative embodiments described herein can clear the manual development/processing hurdles that these enterprise users and IoT device manufacturers/integrators typically face when provisioning IoT devices, and can also alleviate their concerns over the security of communications between the IoT devices and cloud applications. IoT device manufacturers/integrators can thus more quickly provide out-of-the-box experiences and cloud connectivity for their end users, which can advantageously increase device adoption.

In an IoT connectivity service, such as AT&T's IoT CloudConnect, an IoT device may not need to be pre-configured with a carrier's access point name (APN) and a cloud provider setting from the manufacture. Further, cloud lazy binding techniques may be employed so that the IoT device can bootstrap to a roaming carrier in a different country and be shipped to that country, where it can then be connected to a local cellular network by reading the local carrier and local cloud provider settings that have been previously stored from the bootstrapping process. Embodiments described herein can simplify and decrease costs associated with roaming and cloud lazy binding processes.

In essence, the various embodiments described herein can help streamline the overall product/server life cycle, from discovery to sales, deployment, and ultimately, operations.

One or more aspects of the subject disclosure include a device that includes a device processing system and a device operating system (OS) that runs on the device processing system, a cellular modem equipped with a cellular processing system and a cellular OS that runs on the cellular processing system, and a subscriber identity module (SIM) component, wherein the device is configured with a modem security transport stack and a cloud connection stack, and wherein the modem security transport stack is executed in the cellular OS on the cellular processing system.

One or more aspects of the subject disclosure include an apparatus configured to facilitate an Internet-of-Things (IoT) application. The apparatus can include a modem that includes an application (AP) processing system and an AP operating system (OS) that runs on the AP processing system. The apparatus can also include a subscriber identity module (SIM) component, wherein an application stack, a modem security transport stack, and a cloud connection stack are executed in the AP OS on the AP processing system, thereby reducing a need for an apparatus OS and an apparatus processing system that are external to the modem.

One or more aspects of the subject disclosure include a method. The method can comprise configuring an Internet-of-Things (IoT) device with a modem security transport stack, wherein the IoT device includes a device operating system (OS) that runs on a device processing system, a cellular OS that runs on a cellular processing system, and a subscriber identity module (SIM) component, wherein the modem security transport stack is executed in the cellular OS on the cellular processing system, and wherein a device transport stack is executed in the device OS on the device processing system. Further, the method can include providing the IoT device with a modem stack adapter that is configured to facilitate conversion of protocols between the modem security transport stack and the device transport stack.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, IoT SAFE device to cloud integration. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
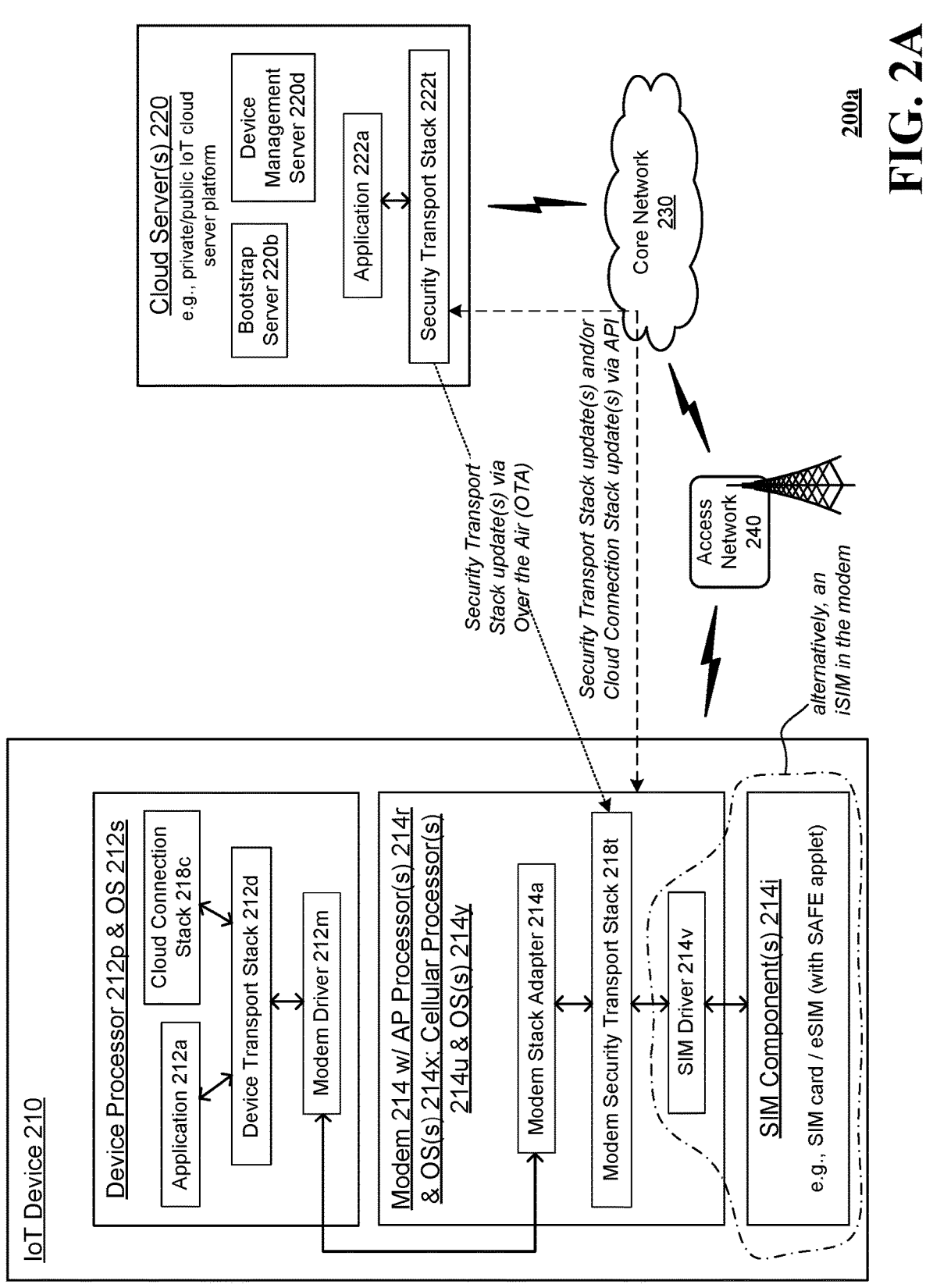
FIG. 2A is a block diagram illustrating an example, non-limiting embodiment of an IoT system functioning within, or operatively overlaid upon, the communications network of FIG. 1 in accordance with various aspects described herein.

FIG. 2A is a block diagram illustrating an example, non-limiting embodiment 200*a* of an IoT system functioning within, or operatively overlaid upon, the communications network 100 of FIG. 1 in accordance with various aspects described herein. As shown in FIG. 2A, the IoT system may include an IoT device 210, one or more cloud servers 220, a core network 230, and an access network 240.

A cloud server 220 may be any computing device that is capable of engaging in IoT communications with, and facilitating various IoT services for, the IoT device 210. As shown in FIG. 2A, a cloud server 220 may include a bootstrap server/functionality 220*b* (to ensure that the IoT device 210 is provisioned with the proper certificate(s) and configuration), a device management server/functionality 220*d* (to facilitate the telemetry/messaging environment), an application stack 222*a*, and a security transport stack 222*t*. The cloud server(s) 220 may be part of a public or private cloud environment. In various embodiments, a portion or an entirety of a given cloud server 220 may be configured in a virtual machine (VM) implementation and/or in a containerized implementation. In a VM implementation, a physical server (e.g., bare metal/cloud provider hardware) and/or an operating system thereof may be abstracted using a hypervisor upon which one or more VMs (each including a guest operating system) may be instantiated. In a containerized implementation, a physical server and an operating system thereof may be abstracted using one or more container runtime systems each corresponding to a server node. Each container runtime system may be controlled to instantiate one or more containers (each with a container runtime interface that interacts with the operating system via the container runtime system).

The core network 230 may include network devices and/or systems that provide a variety of functions. In certain embodiments, the core network 230 may be implemented in a cloud architecture. Examples of functions provided by, or included, in the core network 230 include an access mobility function (AMF) configured to facilitate mobility management in a control plane of the network system (including, for instance, providing user equipment (UE) mobility information associated with the access network 240 and/or UEs to the core network 230), a user plane function (UPF) configured to provide access to a data network, such as a packet data network (PDN), in a user (or data) plane of the network system, a Unified Data Management (UDM) function, a Session Management Function (SMF), a policy control function (PCF), and/or the like. The core network 230 may be in communication with one or more other networks (e.g., one or more content delivery networks (CDNs)), one or more services, cloud server(s) 220, and/or one or more other devices. In one or more embodiments, the core network 230 may include one or more devices implementing other functions, such as a master user database server device for network access management, a PDN gateway server device for facilitating access to a PDN, and/or the like. The core network 230 may include various physical/virtual resources, including server devices, virtual environments, databases, and so on.

In various embodiments, an access network 240 may include a wireless radio access network (RAN), a Wi-Fi network, and/or a wireline network. In exemplary embodiments, the access network 240 may be implemented in open source software (e.g., in an OpenAirInterface (OAI) wireless technology platform). The access network 240 may include network resources, such as one or more physical access resources and/or one or more virtual access resources. Physical access resources can include base station(s) (e.g., one or more eNodeBs, one or more gNodeBs, or the like), one or more satellites, one or more Gigabyte Passive Optical Networks (GPONs) or related components (e.g., Optical Line Terminal(s) (OLT), Optical Network Unit(s) (ONU), etc.), and/or the like. A base station may employ any suitable radio access technology (RAT), such as 4G/LTE, 5G, 6G, or any higher generation RAT. One or more edge computing devices (e.g., multi-access edge computing (MEC) devices or the like) may also be included in or associated with the access network 240. Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the access network 240 may include any number/types of physical/virtual access resources and various types of heterogeneous cell configurations with various quantities of cells and/or types of cells.

In certain embodiments, the access network 240 may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool. In some embodiments, the access network 240 may include, or communicate with, a RAN intelligent controller (RIC).

The IoT device 210 may be any computing device that is capable of obtaining and/or processing data and communicating information with one or more other devices (e.g., over networks 230, 240). As some non-limiting examples, the IoT device 210 may be a communication device (e.g., a router, a modem, a mobile phone, or a wearable device, such as a smart wristwatch, a pair of smart eyeglasses, media-related gear (e.g., augmented reality (AR), virtual reality (VR), or mixed reality (MR) glasses and/or headset/headphones)), a biometric sensor (e.g., for monitoring heart rate, blood pressure, pulse, breathing, etc.), an electrical switch controller, a security camera, an automated assistant, a smart TV, an environmental sensor/controller (e.g., for lighting, temperature, audio, etc.), a kitchen/bath appliance controller (e.g., for a stove, a dehumidifier, etc.), a drapery (e.g., curtain, shade, blinds, or the like) controller, a door/lock controller (e.g., for a room door, a garage door, etc.), a tracking device (e.g., for tracking objects on the road, in a factory/warehouse setting, etc.), a vehicle, a similar type of device, a different type of device, or a combination of some or all of these devices.

As shown in FIG. 2A, the IoT device 210 may include processor(s) 212p and associated OS(s) 212s in which various functions may be implemented or executed. Processor(s) 212p and OS(s) 212s may be "native" to the IoT device 210 (or "native" to a device that the IoT device 210 is integrated with or used within—e.g., a vehicle that an IoT sensor is installed in, etc.). Thus, processor(s) 212p and OS(s) 212s may be distinct and/or operatively separate from other processor(s)/OS(s) of other systems within the IoT device 210, such as those described below with respect to a modem 214 in the IoT device 210.

In various embodiments, an application stack 212a may be implemented or executed in OS 212s. The application stack 212a may include software, rules, protocols, etc. pertaining to desired functions of the IoT device 210—e.g., data measurement/capture, data analysis, data processing, and so on.

In one or more embodiments, a device transport stack 212d may be implemented or executed in OS 212s. The device transport stack 212d may include one or more transport layer protocols, such as Transmission Control Protocol (TCP), User Datagram Protocol (UDP), or the like. Depending on design requirements, the device transport stack 212d may or may not include (e.g., special) encryption capabilities. In various embodiments, a modem driver 212m may be implemented or executed in OS 212s for facilitating communications between the modem 214 and applications running in OS 212s.

In various embodiments, a cloud connection stack 218c may be implemented or executed in OS 212s. The cloud connection stack 218c comprises a set of protocols, interfaces, and/or technologies that facilitate connections between the IoT device 210 and cloud-based services. In various embodiments, the cloud connection stack 218c may facilitate various application layer-based services or processes. As an example, the cloud connection stack 218c may be configured to facilitate bootstrapping for secure onboarding and provisioning of the IoT device 210 onto a network for connection to cloud services. Bootstrapping may involve device registration and authentication. In certain embodiments, bootstrapping may be performed using protocols such as MQTT, CoAP, HTTP, HTTPS, or the like. As another example, the cloud connection stack 218c may be configured to facilitate telemetry (or messaging). Telemetry-related messaging can be conducted between the IoT device 210 and another device or server (e.g., device management server 220d) and/or between devices/systems within the IoT device 210 itself (e.g., the IoT application and the modem 214). Telemetry, for instance, may relate to the collection, storage, and/or analysis of sensor data, device status information, environmental data, or any other relevant data generated by the IoT device 210.

As shown in FIG. 2A, the IoT device 210 may include one or more communication devices (or modems) 214. The modem 214 may be a hardware and/or software component that is capable of facilitating (e.g., wireless) communications between the IoT device 210 and other devices/servers over a network. In one or more embodiments, the modem 214 may be capable of establishing wireless connectivity for the IoT device 210, and may support one or more wireless technologies, such as cellular (e.g., 2G, 3G, 4G, 5G, 6G, and beyond), Wi-Fi (e.g., 802.11b/g/n/ac), Bluetooth, Zigbee, and so on. Supported protocols may include TCP, TCP/Internet Protocol (IP) (TCP/IP), UDP, MQTT, CoAP, HTTP, HTTPS, and/or other network/application layer protocols used for data exchange. As shown in FIG. 2A, the modem 214 may include application (AP) processor(s) 214r and corresponding OS(s) 214x for application layer processing as well as cellular processor(s) 214u and corresponding OS(s) 214y for processing data in one or more other layers.

As shown in FIG. 2A, the modem 214 may include a modem security transport stack 218t. In some embodiments, the modem security transport stack 218t may be executed in an OS 214x on an AP processor 214r. In alternate embodiments, the modem security transport stack 218t may be executed in an OS 214y on a cellular processor 214u. The modem security transport stack 218t comprises a set of protocols, interfaces, and/or technologies that facilitate communications between the IoT device 210 and another device or server (e.g., device management server 220d) and/or between devices/systems within the IoT device 210 itself (such as between the IoT application and the modem 214). In various embodiments, the modem security transport stack 218t may include one or more application layer protocols. As an example, the modem security transport stack 218t may include the MQTT protocol, which is a low-overhead, publish-subscribe model protocol, where the IoT device may publish information (e.g., telemetry data, etc.) to topics and cloud servers or subscribers can subscribe to those topics to receive the published information. As another example, the modem security transport stack 218t may include CoAP, which is a client-server model protocol, where the IoT device may act as a client that requests data/resources from server(s). RESTful principles may be employed, which allows the IoT device 210 to interact with cloud or local servers by way of Uniform Resource Identifiers (URIs) (e.g., via GET, PUT, POST, and/or DELETE commands). Other example application layer protocols may include Advanced Message Queuing Protocol (AMQP), LwM2M, a crypto-graphic (crypto) stack, Zigbee, Z-Wave, Thread, and so on. In various embodiments, the modem security transport stack 218*t* may additionally, or alternatively, include one or more session layer protocols and/or transport layer protocols. For instance, the modem security transport stack 218*t* may include the TLS protocol, the DTLS protocol, or the like that operates over TCP/IP, UDP, or the like.

As shown in FIG. 2A, the modem 214 may include a modem stack adapter 214*a*. In exemplary embodiments, the modem stack adapter 214*a* may be configured to translate and transform traffic between the device transport stack 212*d* and the modem security transport stack 218*t*. The modem stack adapter 214*a* may be configured to effect protocol conversion (or select the appropriate protocol to use) based on one or more criteria. For instance, in a case where the IoT device 210 is a constrained device (i.e., a resource-constrained device that should operate in low power consumption conditions), the modem stack adapter 214*a* may employ CoAP or LwM2M, rather than MQTT, so as to reduce overall power consumption by the device. In a different situation where the IoT device 210 is not a con-strained device, the modem stack adapter 214*a* may employ MQTT, rather than CoAP or LwM2M. In some embodi-ments, the device application may request that a particular protocol be used. In these embodiments, the modem stack adapter 214*a* may simply effect the conversion by employ-ing the requested protocol.

Figure 2B:
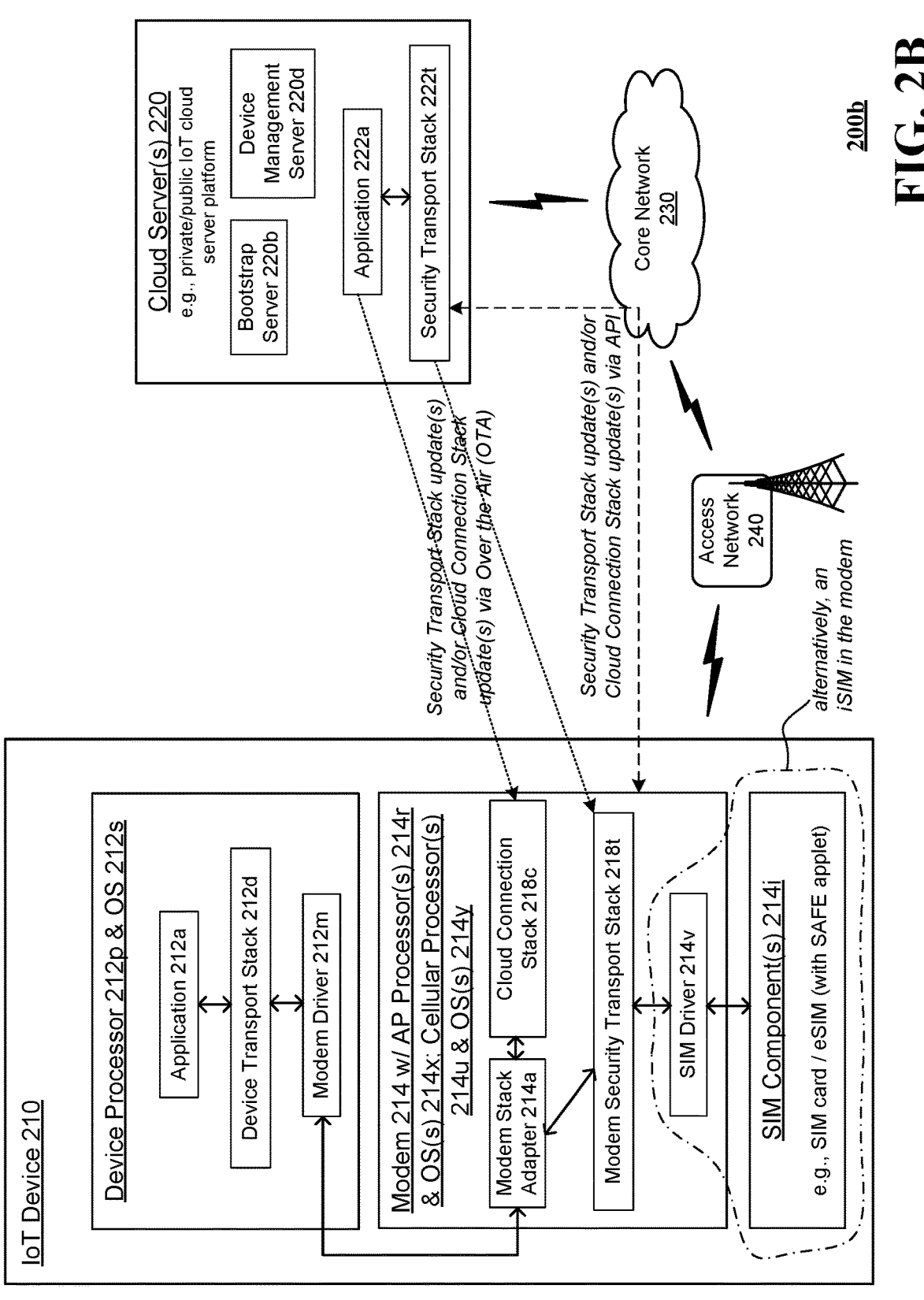
FIG. 2B is a block diagram illustrating an alternate example, non-limiting embodiment of an IoT system functioning within, or operatively overlaid upon, the communications network of FIG. 1 in accordance with various aspects described herein.
Figure 2C:
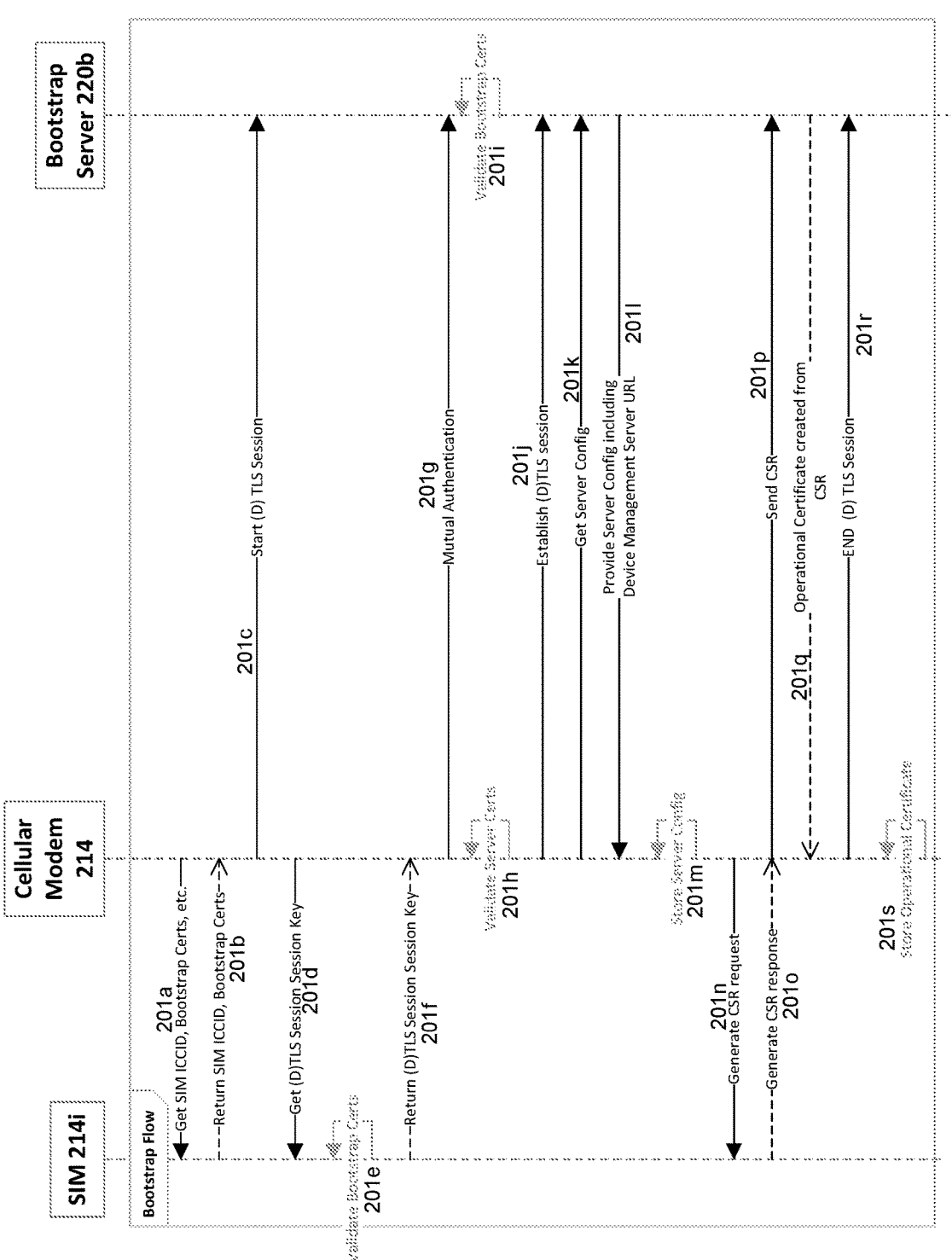
FIGS. 2C and 2D are flow diagrams that respectively illustrate an example bootstrapping process and an example messaging/telemetry process with respect to the IoT device architecture of FIG. 2B, in accordance with various aspects described herein.
Figure 2D:
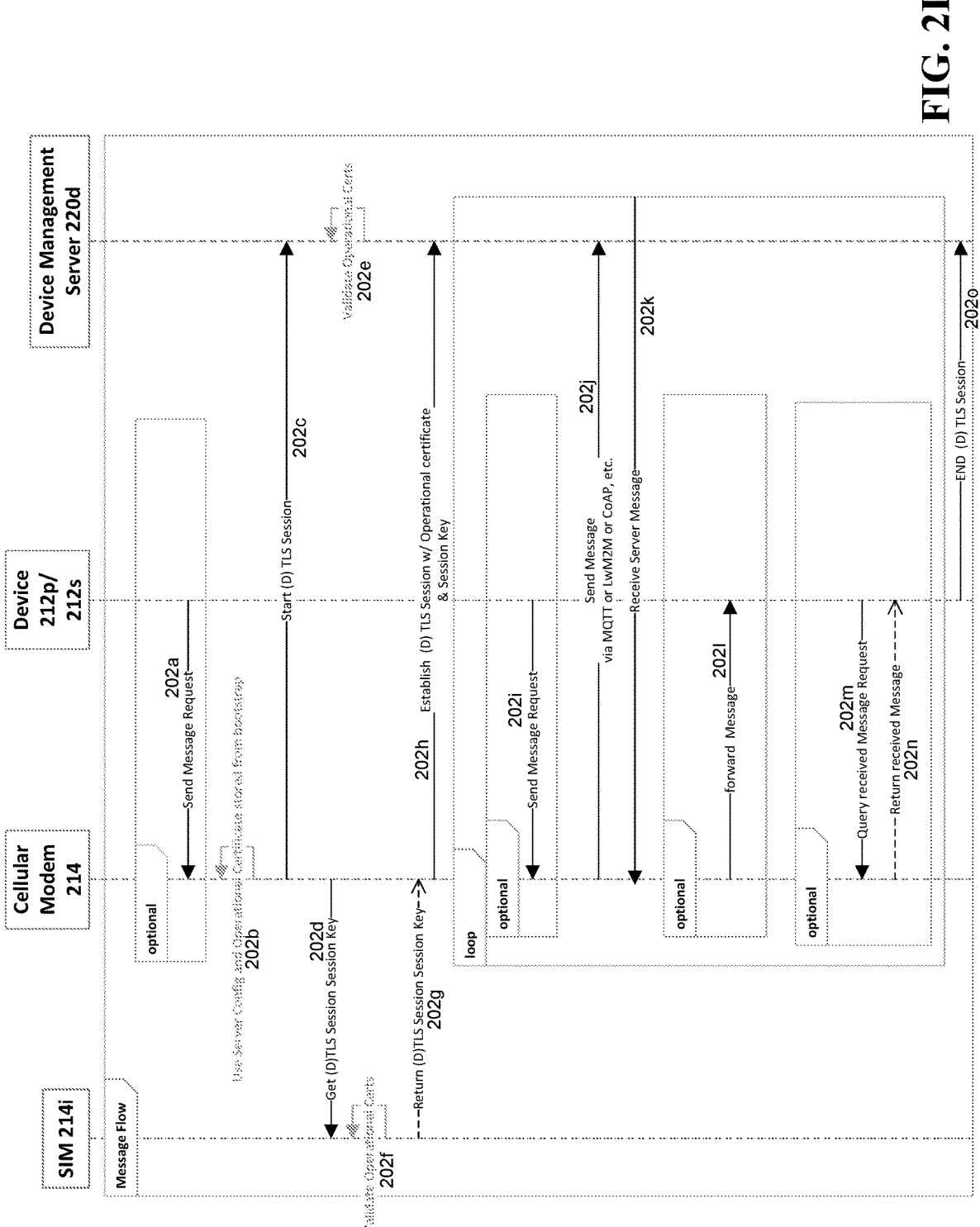
Figure 2E:
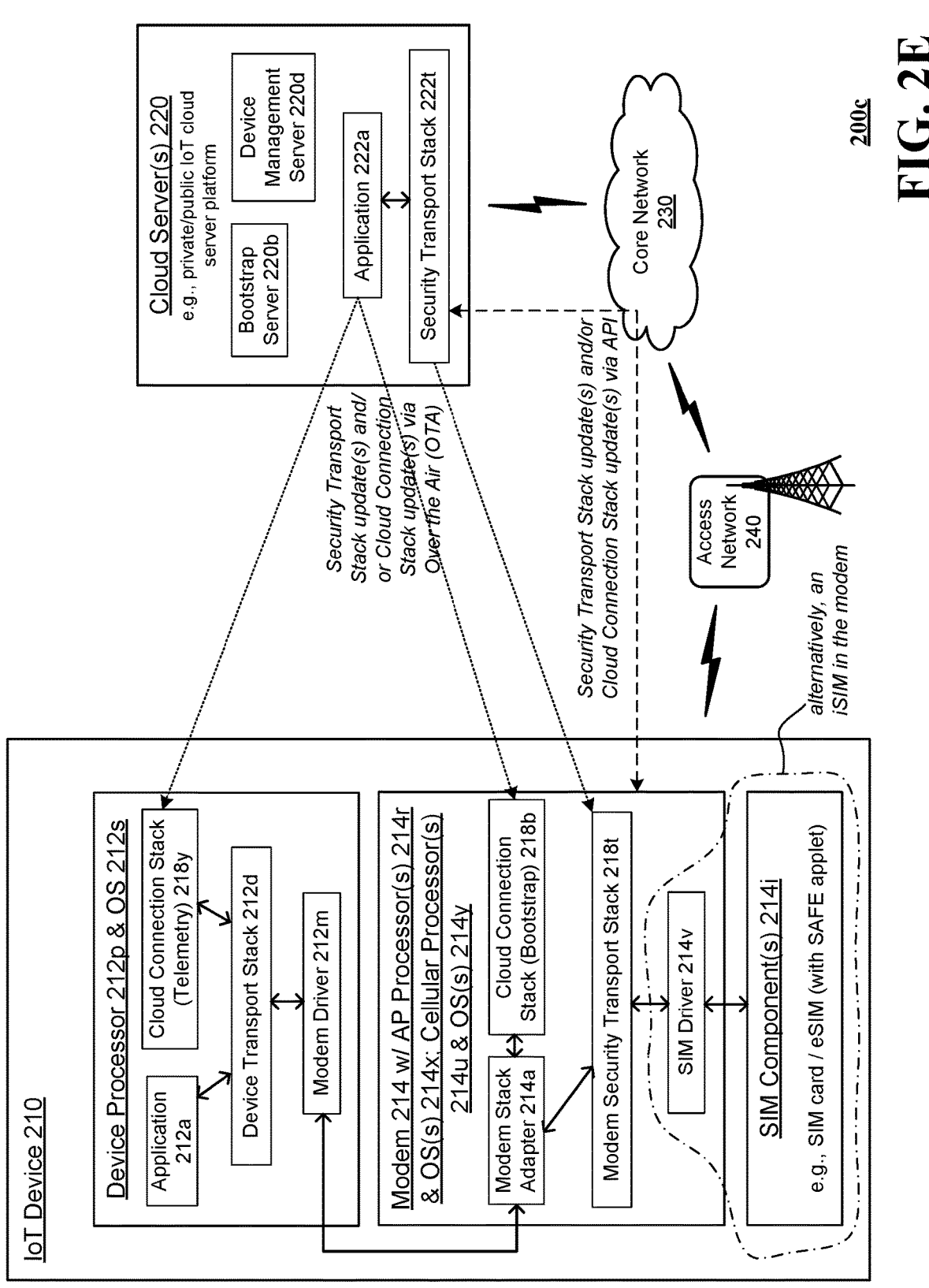
FIG. 2E is a block diagram illustrating an alternate example, non-limiting embodiment of an IoT system functioning within, or operatively overlaid upon, the communications network of FIG. 1 in accordance with various aspects described herein.
Figure 2F:
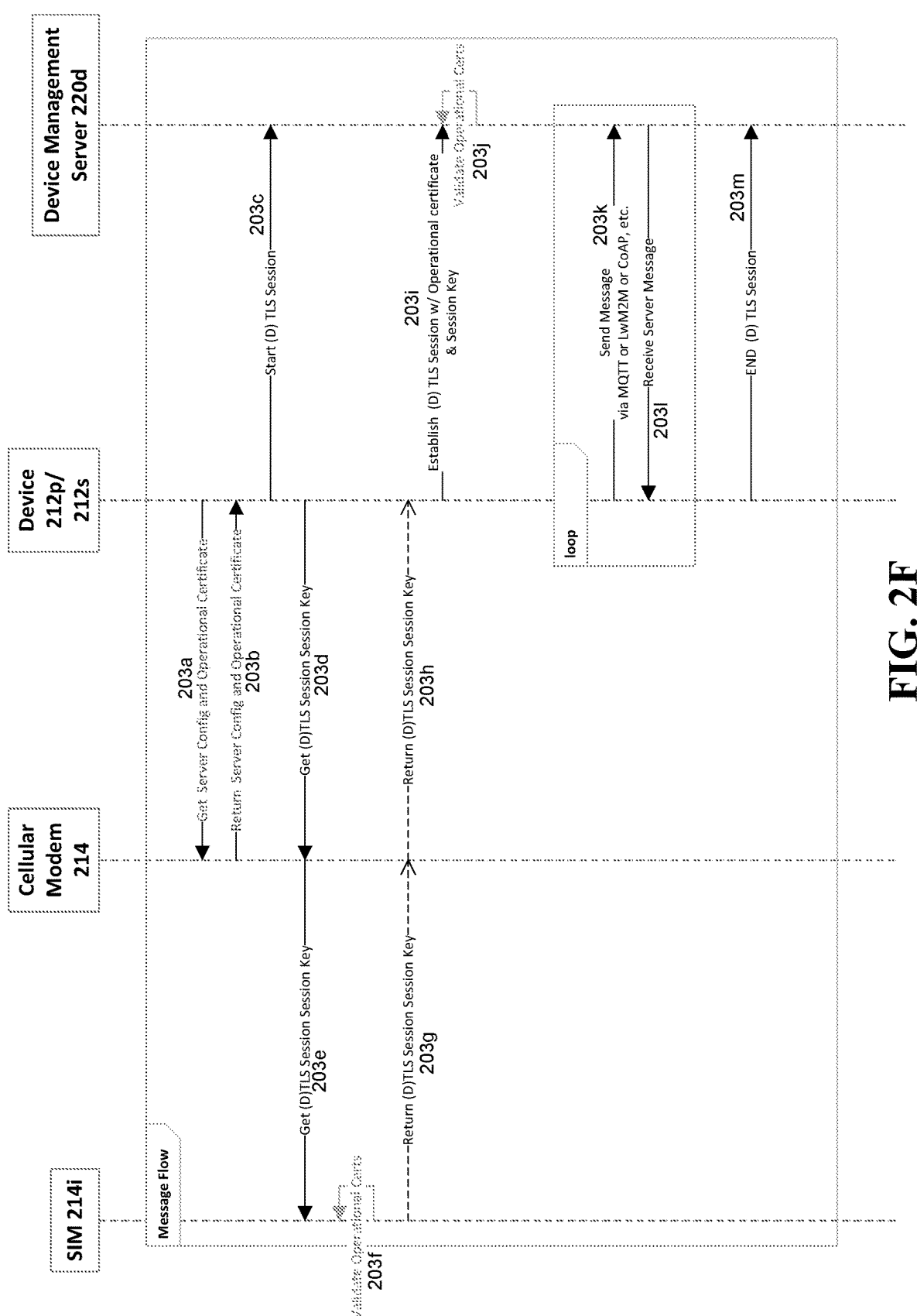
FIG. 2F is a flow diagram that illustrates an example messaging/telemetry process with respect to the IoT device architecture of FIG. 2E, in accordance with various aspects described herein.
Figure 2G:
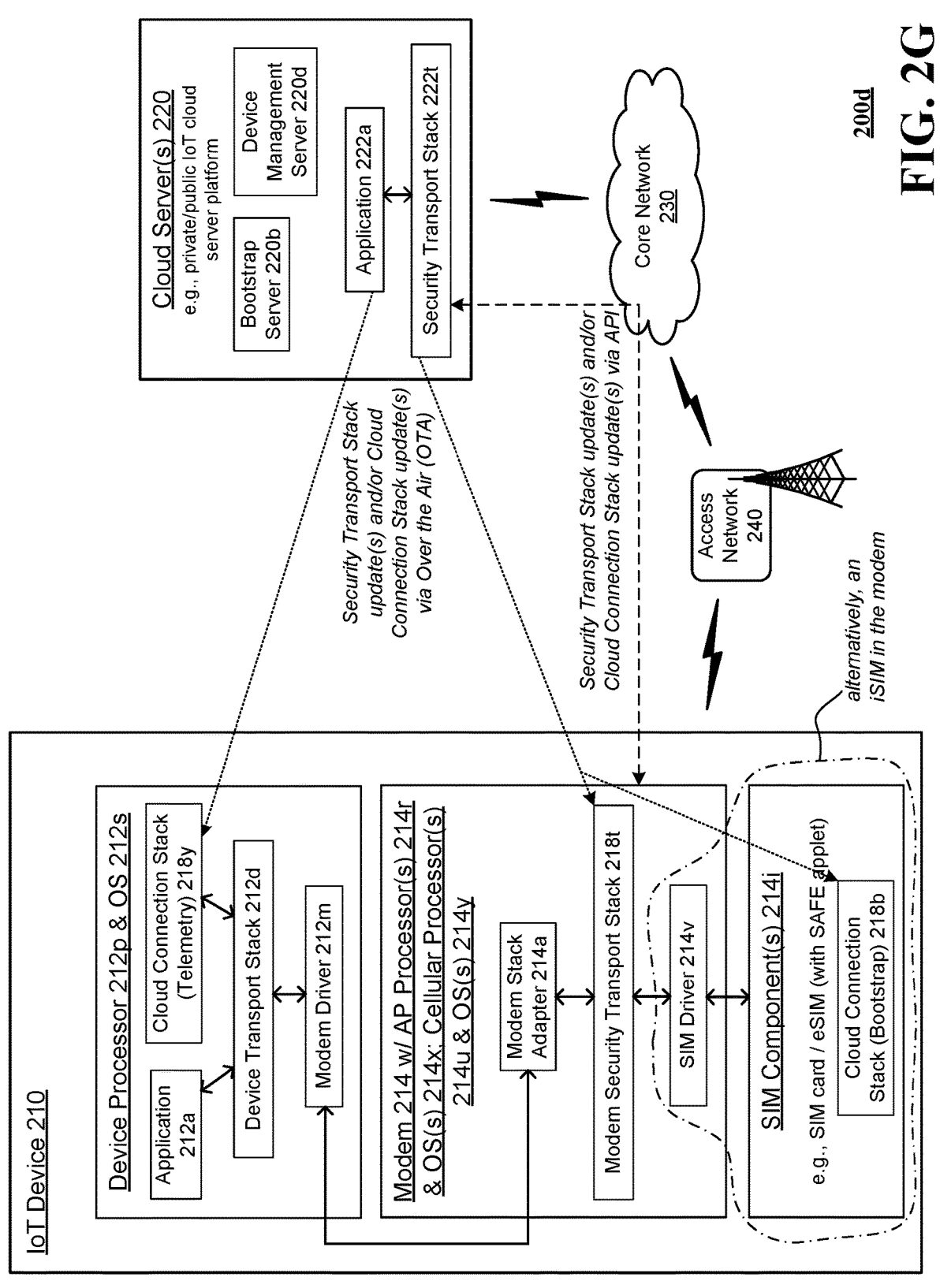
FIG. 2G is a block diagram illustrating an alternate example, non-limiting embodiment of an IoT system functioning within, or operatively overlaid upon, the communications network of FIG. 1 in accordance with various aspects described herein.
Figure 2H:
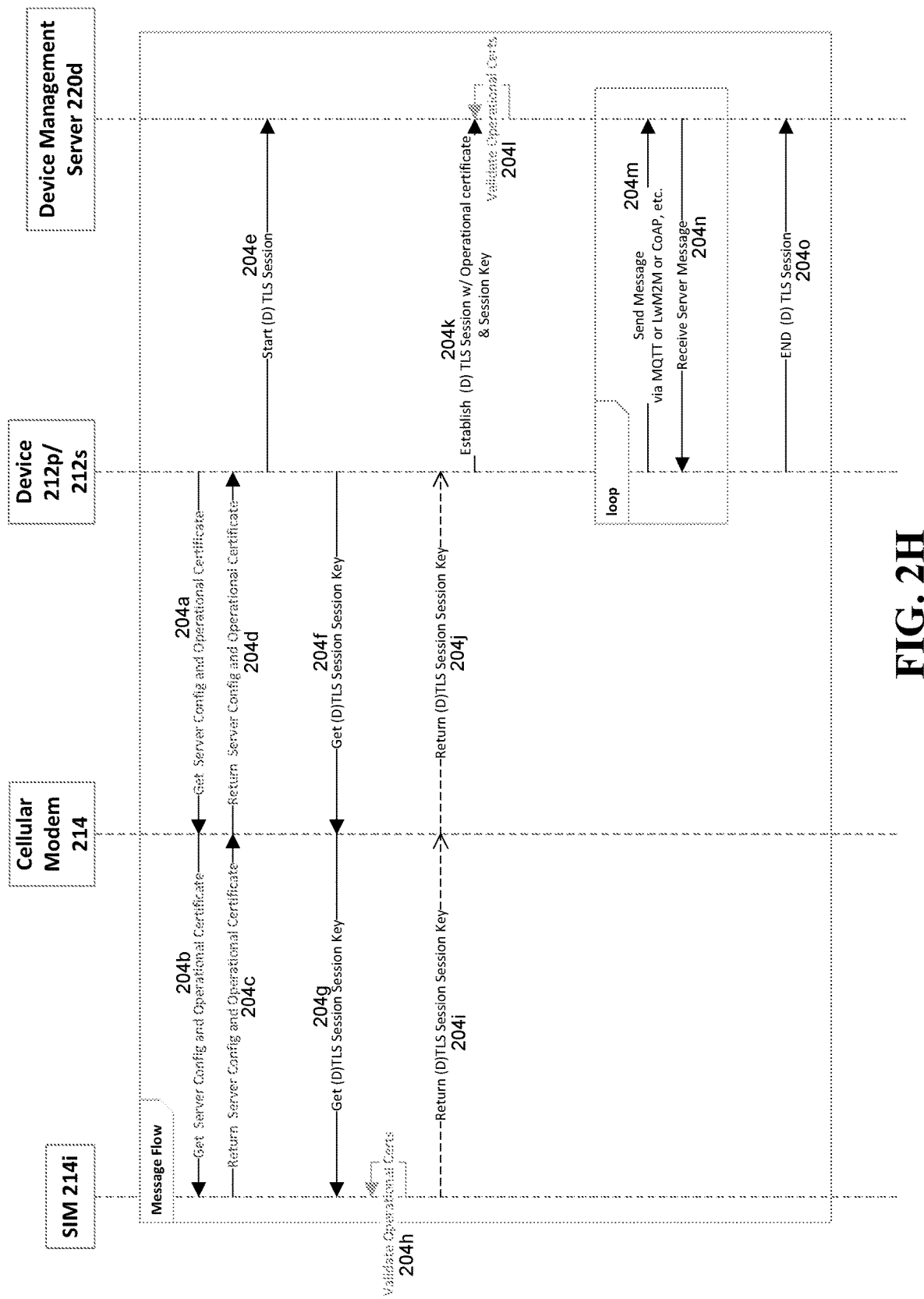
FIG. 2H is a flow diagram that illustrates an example messaging/telemetry process with respect to the IoT device architecture of FIG. 2G, in accordance with various aspects described herein.
Figure 2I:
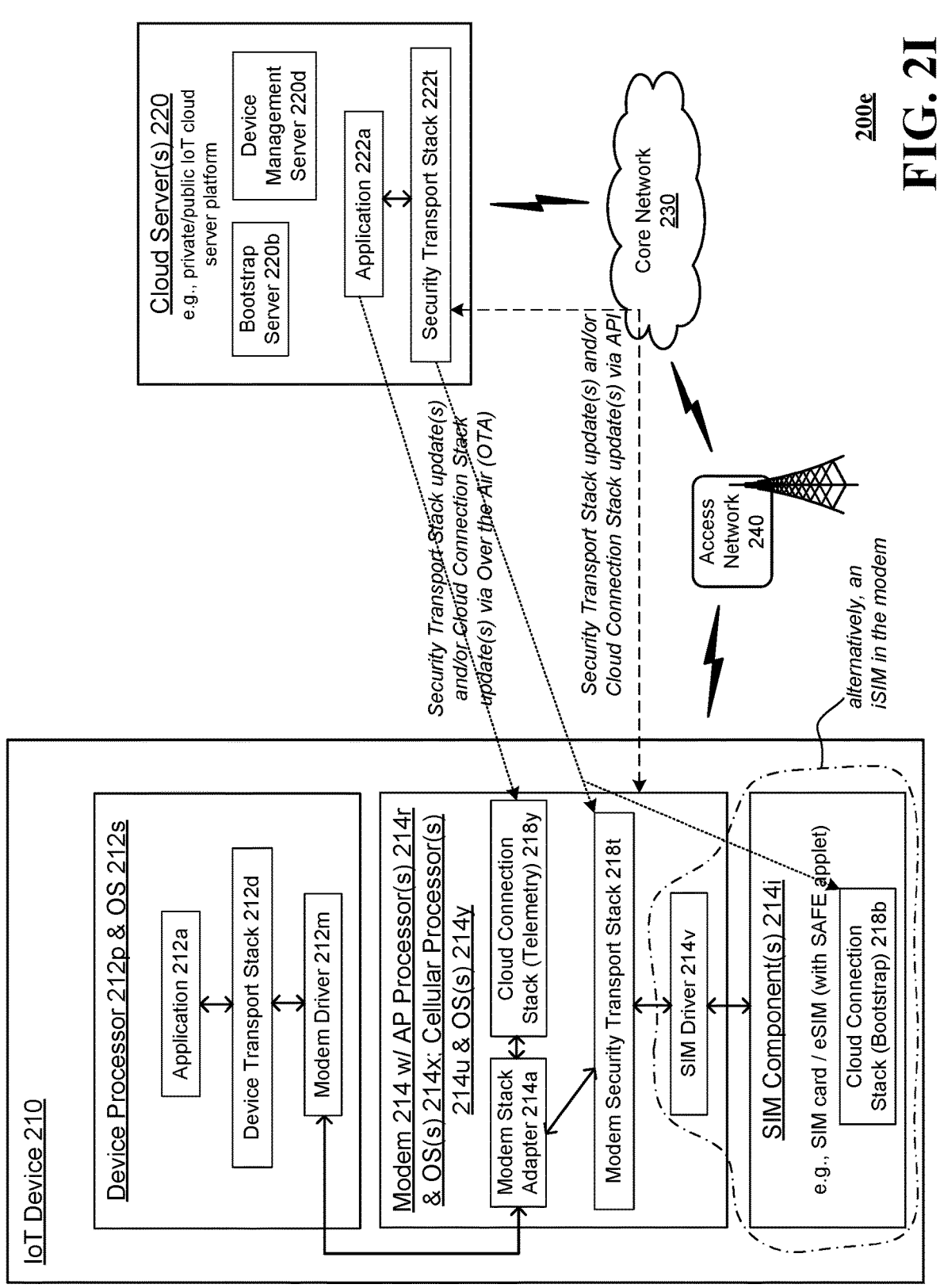
FIG. 2I is a block diagram illustrating an alternate example, non-limiting embodiment of an IoT system functioning within, or operatively overlaid upon, the communications network of FIG. 1 in accordance with various aspects described herein.
Figure 2J:
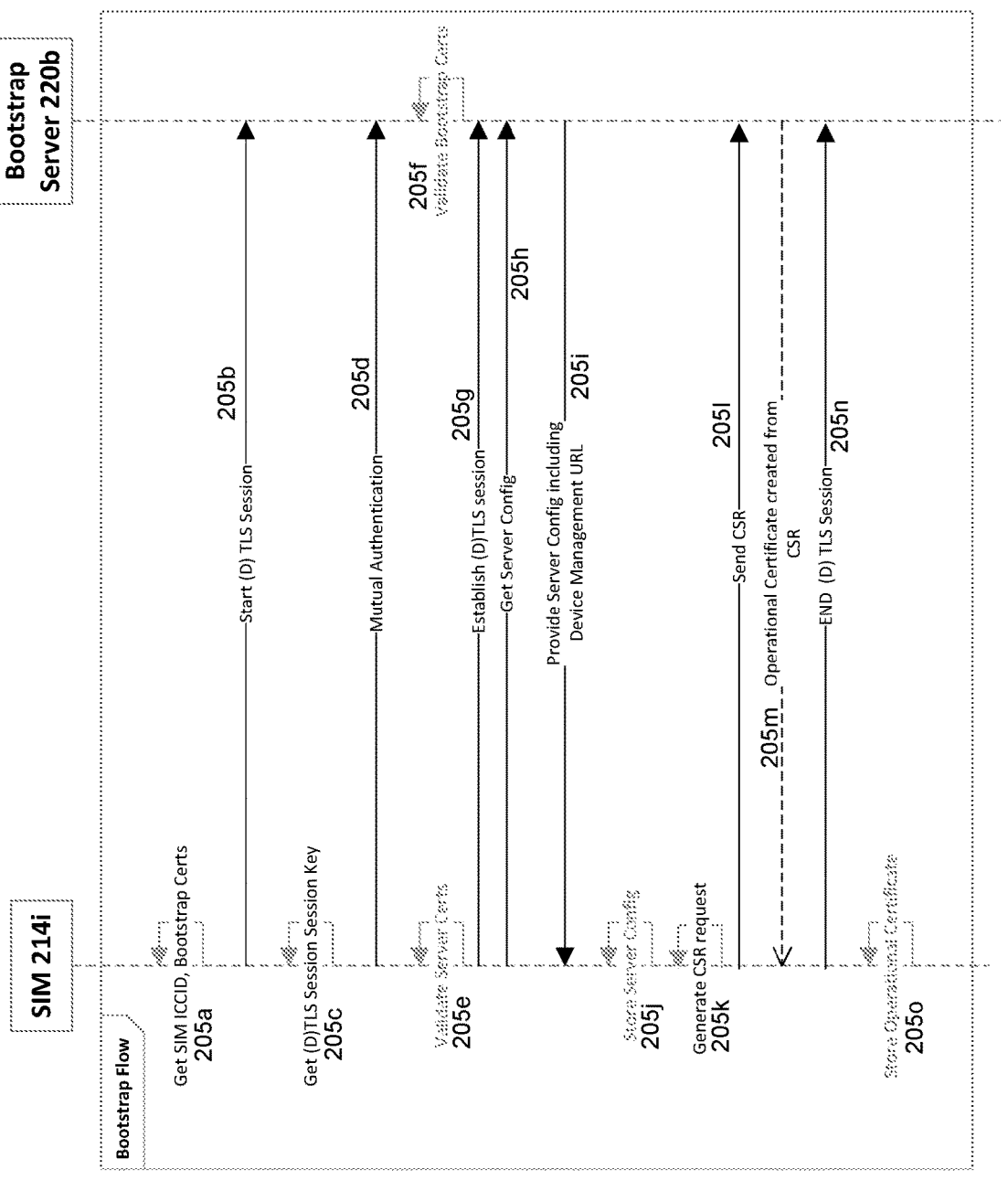
FIGS. 2J and 2K are flow diagrams that respectively illustrate an example bootstrapping process and an example messaging/telemetry process with respect to the IoT device architecture of FIG. 2I, in accordance with various aspects described herein.
Figure 2K:
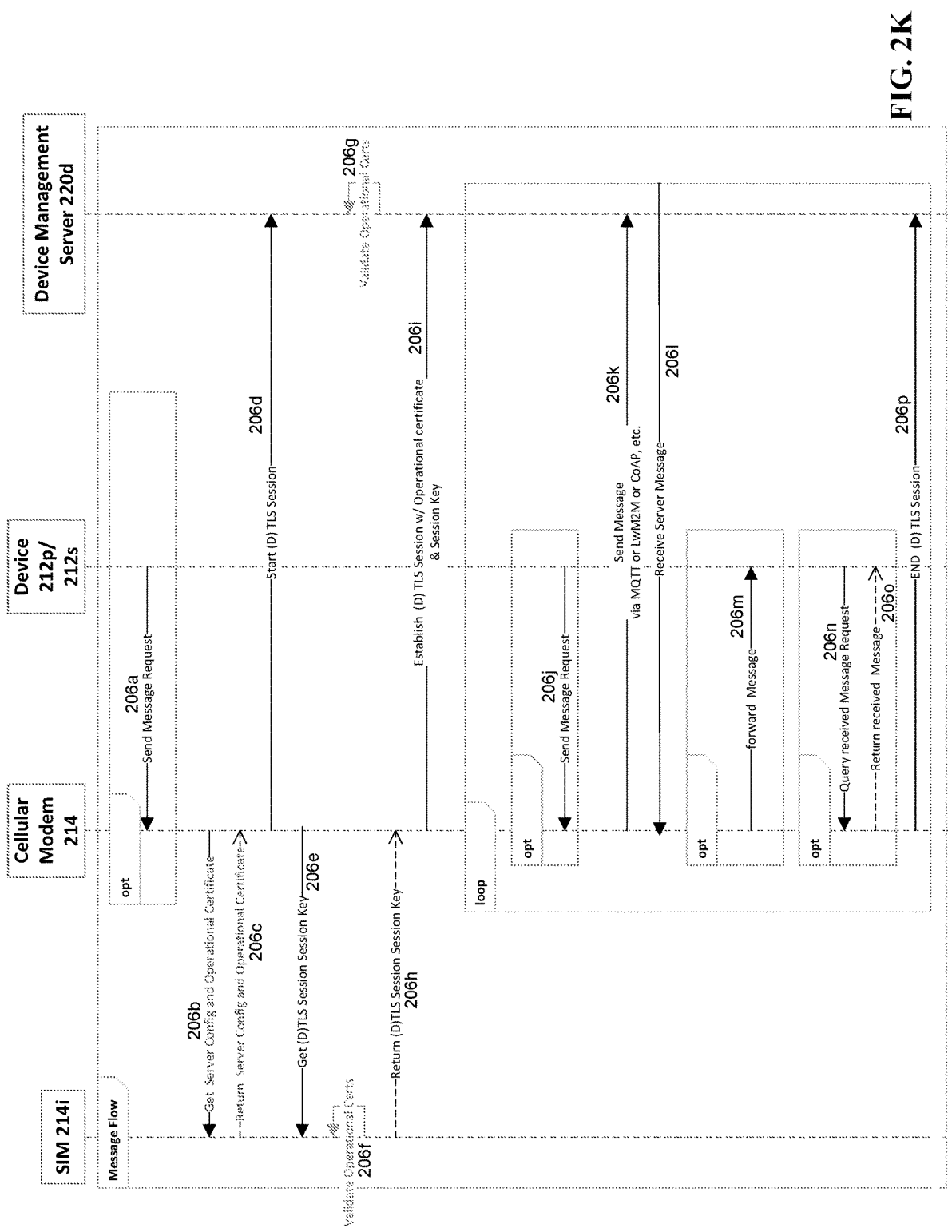
Figure 2L:
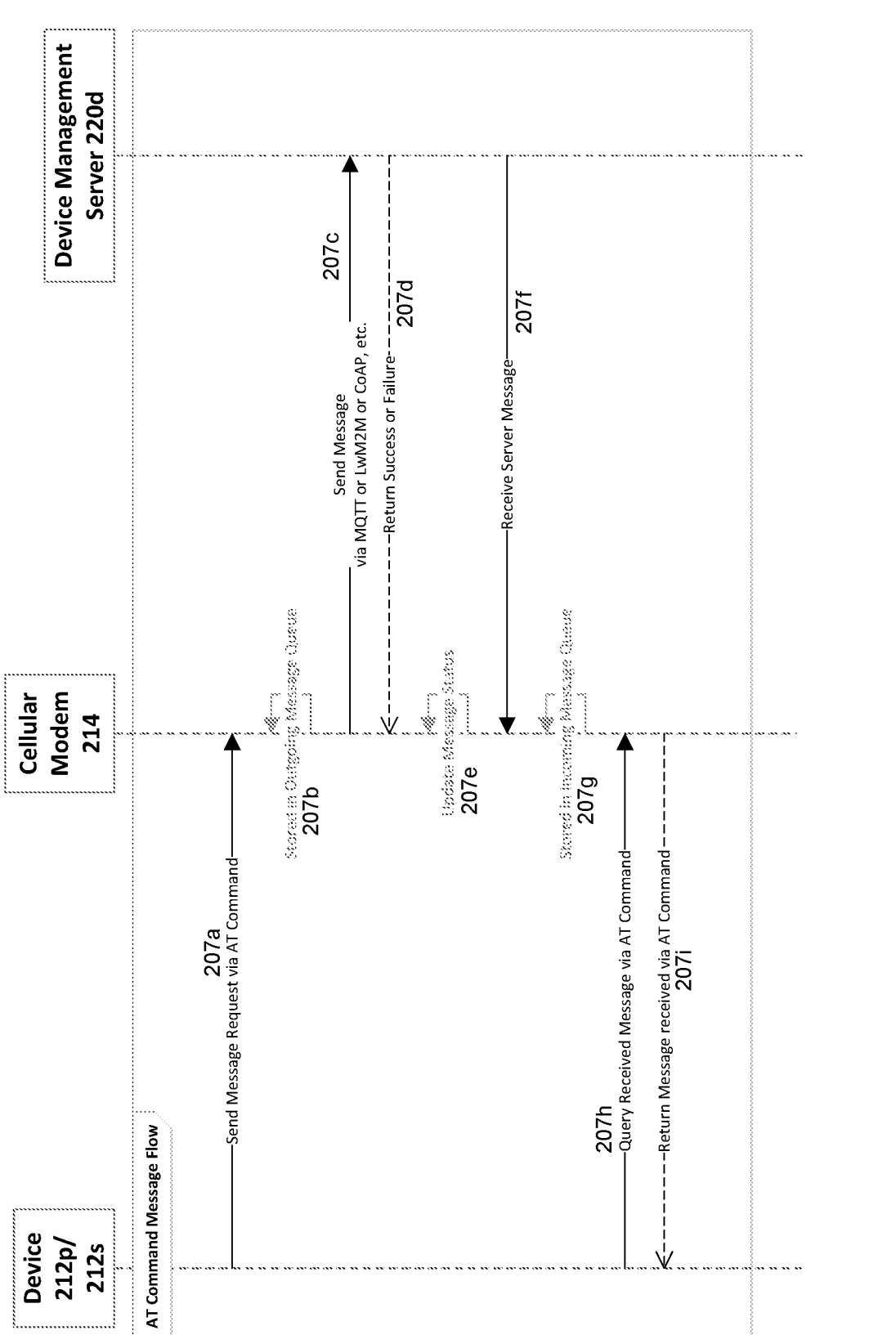
FIGS. 2L and 2M are example flow diagrams that illustrate different ways (respectively using attention (AT) command(s) and using Hypertext Transfer Protocol (HTTP)/HTTP Secure (HTTPS)/MQTT command(s)) for facilitating device-to-cellular modem communications, in accordance with various aspects described herein.
Figure 2M:
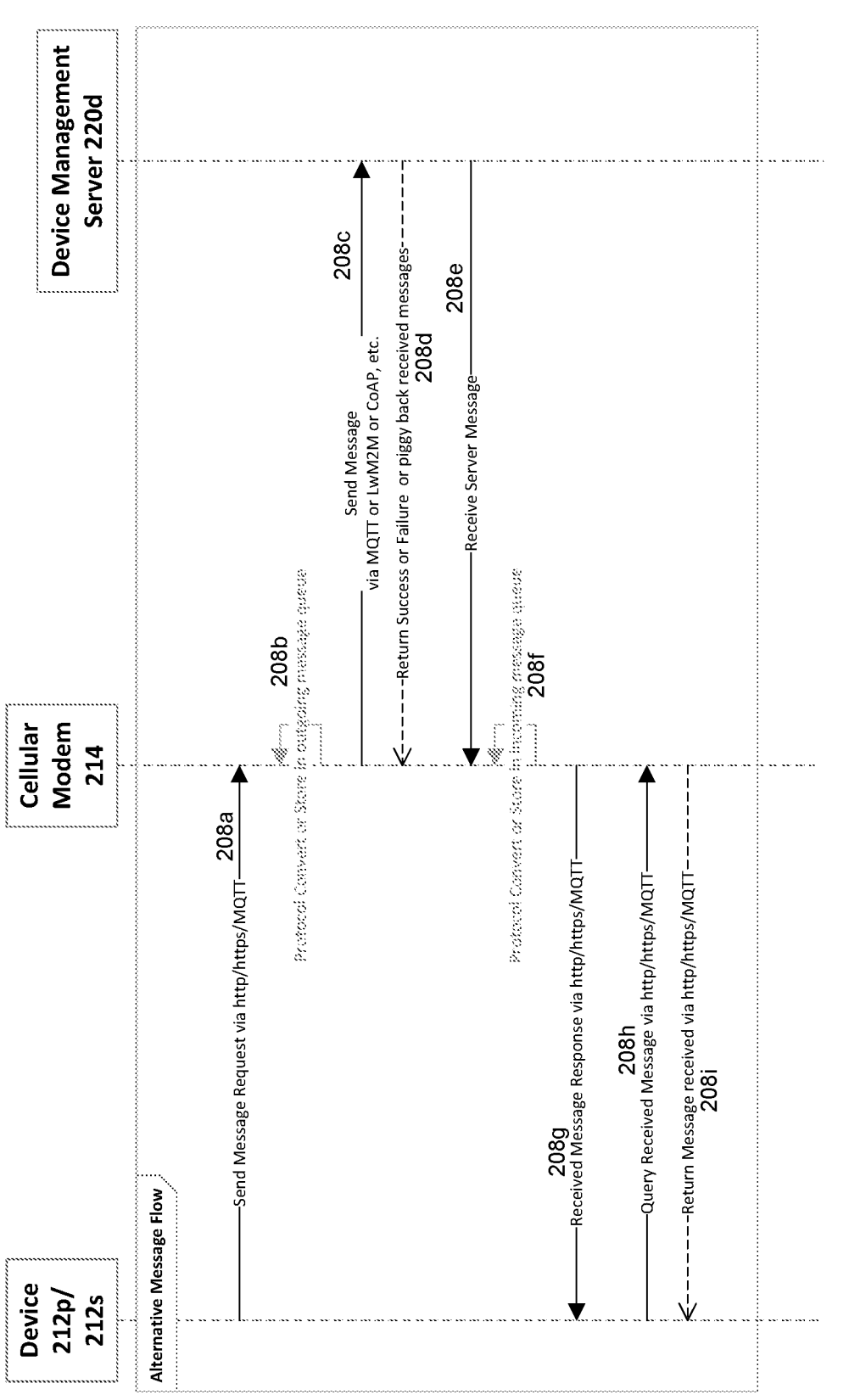

FIGS. 2L and 2M are example flow diagrams that illus-trate different ways (respectively using AT command(s) and using HTTP/HTTPS/MQTT command(s)) for facilitating device-to-cellular modem communications, in accordance with various aspects described herein. Referring to FIG. 2L, the device may send (207*a*) a message request to the modem 214 via an AT command, and the modem 214 may store (207*b*) the message in an outgoing message queue for forwarding to the device management server 220*d*. As shown, the modem 214 may forward (207*c*) the message via MQTT, LwM2M. CoAP, or the like. The device manage-ment server 220*d* may return (207*d*) with an indication of success or failure, after which the modem 214 may update (207*e*) a status for the message. The device management server 220*d* may send (207*f*) a server message, which the modem 214 may store (207*g*) in an incoming message queue. The device can then query (207*h*) the modem 214 for a received message via an AT command, where the modem 214 may respond (207*i*) with the received message via an AT command. Implementing the modem stack adapter 214*a* to facilitate such device-to-cellular modem communications reduces or eliminates a need for the device processor(s) 212*p* and OS(s) 212*s* to run special IoT transport protocols, which simplifies IoT device development and reduces costs for IoT device developers.

Referring to FIG. 2M, the device may send (208*a*) a message request to the modem 214 via HTTP/HTTPS/MQTT, and the modem 214 may convert (using a protocol) and/or store (208*b*) the message in an outgoing message queue for forwarding to the device management server 220*d*. As shown, the modem 214 may forward (208*c*) the message via MQTT, LwM2M, CoAP, or the like. The device management server 220*d* may return (208*d*) with an indication of success or failure (or piggy back received messages). The device management server 220*d* may send (208*c*) a server message, after which the modem 214 may convert (using a protocol) and/or store (208*f*) the message in an incoming message queue. The modem 214 may send (208*g*) a received message response to the device via HTTP/HTTPS/MQTT. The device can then query (208*h*) the modem 214 for a received message via HTTP/HTTPS/MQTT, where the modem 214 may respond (208*i*) with the received message via HTTP/HTTPS/MQTT. Implementing the modem stack adapter 214*a* to facilitate such device-to-cellular modem communications similarly reduces or eliminates a need for the device processor(s) 212*p* and OS(s) 212*s* to run special IoT transport protocols, which simplifies IoT device devel-opment and reduces costs for IoT device developers.

Figure 2N:
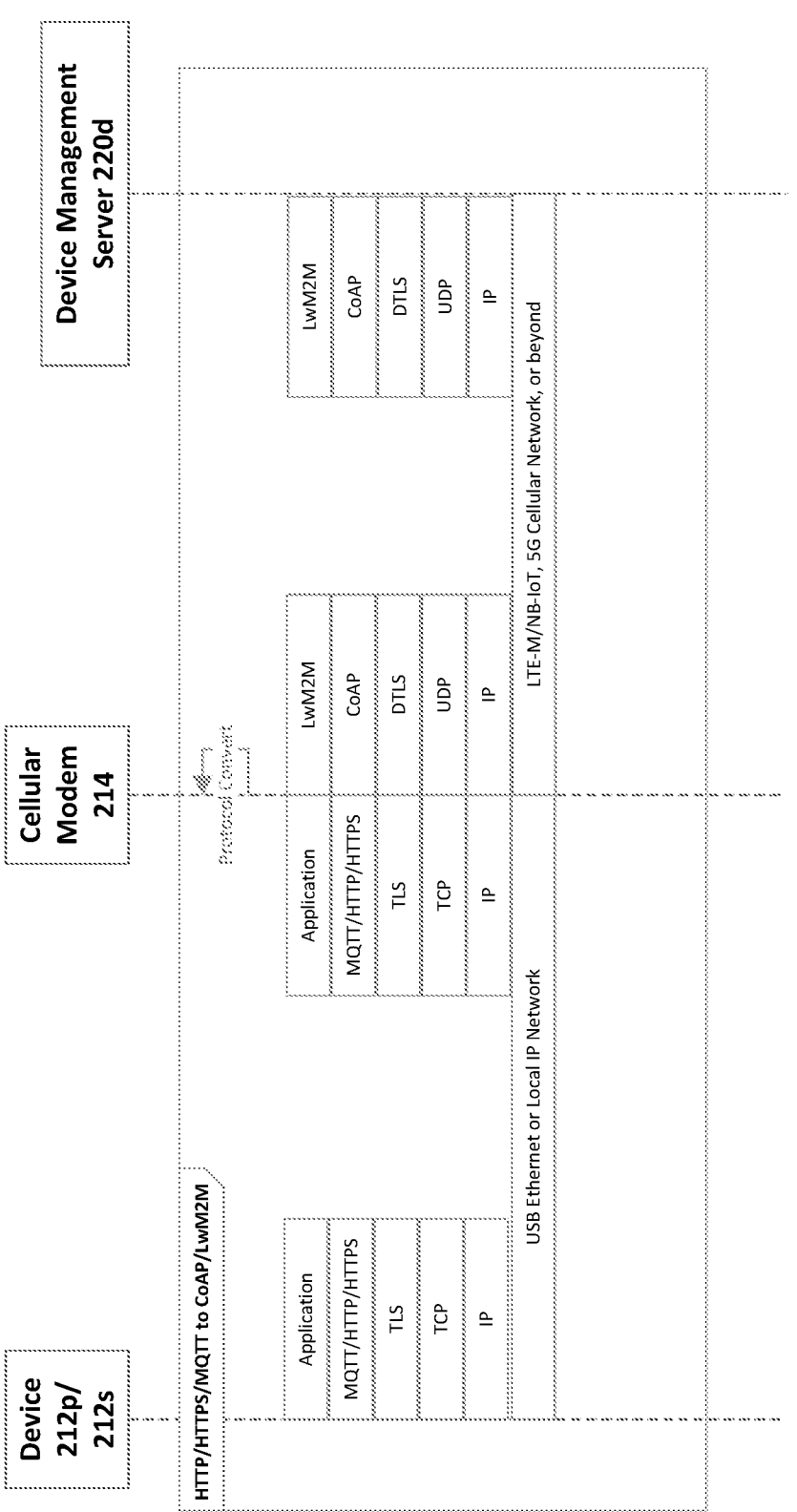
FIG. 2N illustrates example protocol translations between devices/systems in accordance with various aspects described herein.
Figure 20:
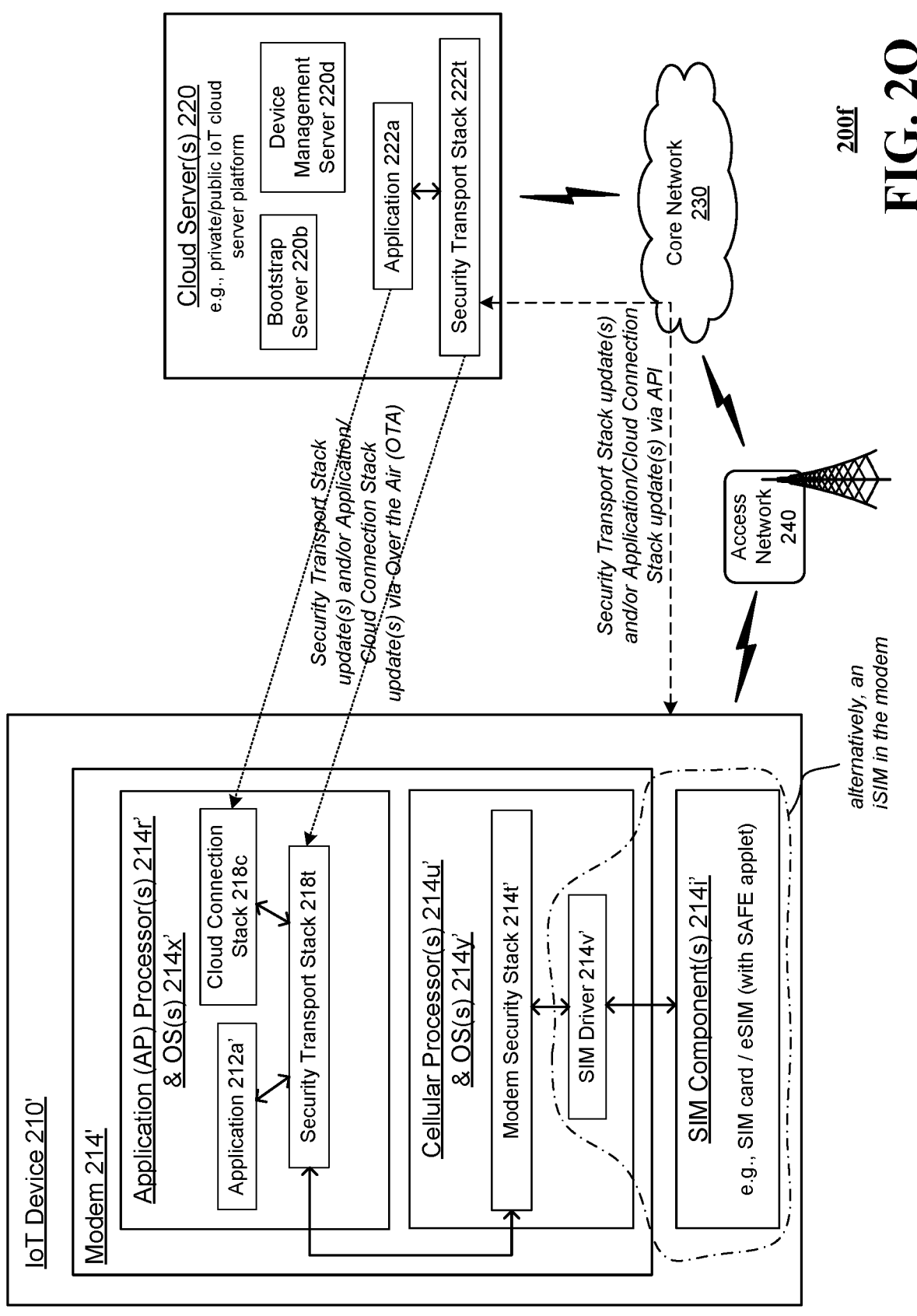

FIG. 2N illustrates example protocol translations between devices/systems in accordance with various aspects described herein. As shown in FIG. 2N, various possible translations by the modem stack adapter 214*a* are possible. For instance, the device application (via processor 212*p*/OS 212*s*) may send a communication to the modem 214 via HTTP/HTTPS/MQTT, and the modem stack adapter 214*a* may "translate" it into a CoAP format for transmission to the device management server 220*d*. As another example, the device may communicate with the modem 214 over TCP, and the modem 214 may (via conversion by the modem stack adapter 214*a*) communicate with the device manage-ment server 220*d* via UDP. It will be understood and appreciated that conversions other than those shown in FIG. 2N are also possible. For example, the device may send a communication to the modem 214 via HTTP, and the modem stack adapter 214*a* may translate it for transmission to the device management server 220*d* via MQTT.

Returning to FIG. 2A, the modem 214 may include a SIM driver 214*v* and one or more SIM components 214*i*. SIM component(s) 214*i* may include any type of SIM, such as an embedded SIM (eSIM) (e.g., with a SAFE applet), a SIM card, an integrated SIM (iSIM) that is implemented in the modem, or the like. A SIM component 214*i* may store subscriber identity and authentication information that enables access to (e.g., cellular) networks. The SIM driver 214*v* may provide an interface for establishing communica-tions with the SIM component(s) 214*i*, and may provide various functionalities relating to SIM initialization, authen-tication, configuration, management, and/or error handling and recovery.

By having the modem 214 "fully" support the security transport stack, there is no need for the IoT device 210's own processor(s) 212*p* and OS(s) 212*s* to include any special security/transport stacks. In various embodiments, updates to the modem security transport stack 218*t* (e.g., based on cloud server updates to security transport protocol(s)) can be made over the air (OTA) (e.g., via receipt of short message service (SMS) communications) or using application pro-gramming interface (API) calls made over an established bidirectional channel. In one or more embodiments, updates to the cloud connection stack 218*c* (e.g., based on cloud server updates to application-related protocol(s)) can simi-larly be made via OTA and/or via API calls.

In certain embodiments, the IoT device 210 may have an alternative configuration in which the functionality of the cloud connection stack and the security transport stack are included (or consolidated) in a modem. FIG. 2B is a block diagram illustrating an alternate example, non-limiting embodiment 200*b* of an IoT system functioning within, or operatively overlaid upon, the communications network 100 of FIG. 1 in accordance with various aspects described herein. As shown in FIG. 2B, the cloud connection stack 218c and the modem security transport stack 218t may be included (or consolidated) in the modem 214. In some embodiments, the cloud connection stack 218c and/or the modem security transport stack 218t may be executed in an OS 214x on an AP processor 214r. In alternate embodiments, the cloud connection stack 218c and/or the modem security transport stack 218t may be executed in an OS 214y on a cellular processor 214u. Although not shown in FIG. 2B, in some alternate embodiments, a portion or an entirety of the functionality of the cloud connection stack 218c may be implemented in the modem stack adapter 214a. Implementing the IoT device 210 as shown in FIG. 2B allows for pre-bootstrapping of the IoT device 210 prior to shipment to users (e.g., customers or end users). This reduces or eliminates a need for bootstrapping in the field, which can simplify IoT device deployment.

FIGS. 2C and 2D are flow diagrams that respectively illustrate an example bootstrapping process and an example messaging/telemetry process with respect to the IoT device architecture of FIG. 2B, in accordance with various aspects described herein. Referring to FIG. 2C (where bootstrapping is performed by the modem 214), the modem 214 may request (201a) and obtain (201b) a SIM Integrated Circuit Card Identification Number (ICCID), bootstrap certificates, etc. from the SIM component 214i. The modem 214 may then initiate (201c) a (D)TLS session with the bootstrap server 220b and request (201d) and obtain (201f) a (D)TLS session key from the SIM component 214i (which may involve the SIM component 214i performing validation (201e) of the bootstrap certificates). The modem 214 and the bootstrap server 220b may perform mutual authentication (201g), where the modem 214 validates server certificates (201h) and the bootstrap server 220b validates the bootstrap certificates (201i), resulting in an established (D)TLS session (201j). The modem 214 may then request (201k) and obtain (201l) server configuration information (e.g., including a device management server uniform resource locator (URL)) from the bootstrap server 220b, and subsequently store (201m) the server configuration information. The modem 214 may generate and send (201n) a certificate signing request (CSR) to the SIM component 214i and the SIM component 214i may generate and send (201o) a CSR response back to the modem 214. The modem 214 may transmit (201p) the CSR to the bootstrap server 220b, which may then create an operational certificate using the CSR for the modem 214 (201q). The (D)TLS session may then end (201r) and the operational certificate may be stored (201s) in the modem 214.

Referring to FIG. 2D (where messaging/telemetry is performed by the device processor(s) 212p/OS(s) 212s based on bootstrapping information in the modem 214), the device may (optionally) send a message request (202a) to the modem 214. The modem 214 may use (202b) the server configuration information and the operational certificate previously stored from bootstrapping (e.g., FIG. 2C above) to initiate (202c) a (D)TLS session with the device management server 220d. The modem 214 may request (202d) and obtain (202g) a (D)TLS session key from the SIM component 214i (which may involve the SIM component 214i performing validation (202f) of the operational certificate and the device management server 220d performing validation (202c) of the operational certificate). A (D)TLS session may be established (202h) using the operational certificate and the session key, after which optional loops of communications may occur. For instance, the device may send a message request (202i) to the modem 214; the modem 214 may send (202j) a message (e.g., via MQTT, LwM2M, CoAP, or the like) to the device management server 220d and receive (202k) a server message therefrom; the modem 214 may forward (202l) a message to the device; and/or the device may query (202m) the modem 214 for a received message and receive (202n) a received message from the modem 214. The (D)TLS session may end (202o) when messaging/telemetry is complete.

In certain embodiments, the IoT device 210 may have an alternative configuration in which the telemetry functionality of the cloud connection stack is implemented for execution by the device's processor(s) and OS(s), whereas the bootstrapping functionality of the cloud connection stack and the security transport stack are included (or consolidated) in a modem. FIG. 2E is a block diagram illustrating an alternate example, non-limiting embodiment 200c of an IoT system functioning within, or operatively overlaid upon, the communications network 100 of FIG. 1 in accordance with various aspects described herein. As shown in FIG. 2E, the telemetry functionality of the cloud connection stack (218y) may be configured for execution by the device processor(s) 212p and OS(s) 212s, whereas bootstrapping functionality of the cloud connection stack (218b) and the modem security transport stack 218t may be included in the modem 214. In some embodiments, the bootstrapping functionality of the cloud connection stack (218b) and the modem security transport stack 218t may be executed in an OS 214x on an AP processor 214r. In alternate embodiments, the bootstrapping functionality of the cloud connection stack (218b) and the modem security transport stack 218t may be executed in an OS 214y on a cellular processor 214u. Although not shown in FIG. 2E, in some alternate embodiments, a portion or an entirety of the bootstrapping functionality of the cloud connection stack 218c may be implemented in the modem stack adapter 214a.

Employing the cloud connection stack for telemetry reduces or eliminates a need for any special telemetry stacks in the OS(s) 212s. Furthermore, leveraging the modem stack adapter 214a for bootstrapping reduces or eliminates a need for special bootstrapping stacks in the OS(s) 212s. Implementing the IoT device 210 as shown in FIG. 2E also allows for pre-bootstrapping of the IoT device 210 via the modem 214 prior to shipment to users (e.g., customers or end users). This reduces or eliminates a need for bootstrapping in the field, which can simplify IoT device deployment.

FIG. 2F is a flow diagram that illustrates an example messaging/telemetry process with respect to the IoT device architecture of FIG. 2E, in accordance with various aspects described herein. As shown in FIG. 2F (where messaging/telemetry is performed in the device processor(s) 212p and OS(s) 212s based on bootstrapping information stored in the modem 214), the device may request for (203a) and obtain (203b) the server configuration information and the operational certificate stored in the modem 214 to initiate (203c) a (D)TLS session with the device management server 220d. The device may request (203d) a (D)TLS session key from the modem 214, which may in turn request (203e) the (D)TLS session key from the SIM component 214i (the SIM component 214i may perform validation (203f) of the operational certificate). The SIM component 214i may return (203g) the (D)TLS session key to the modem 214, which may in turn send (203h) the (D)TLS session key to the device. A (D)TLS session may be established (203i) using the operational certificate and the session key. The device management server 220d may validate (203j) the operational certificate, after which loops of communications may occur.

For instance, the device may send (203*k*) a message (e.g., via MQTT, LwM2M, CoAP, or the like) to the device management server 220*d* and receive (203*l*) a server message therefrom. The (D)TLS session may end (203*m*) when messaging/telemetry is complete.

In certain embodiments, the IoT device 210 may have an alternative configuration in which the telemetry functionality of the cloud connection stack is implemented for execution by the device's processor(s) and OS(s), the bootstrapping functionality of the cloud connection stack is included in a SIM component, and the security transport stack is included in a modem. FIG. 2G is a block diagram illustrating an alternate example, non-limiting embodiment 200*d* of an IoT system functioning within, or operatively overlaid upon, the communications network 100 of FIG. 1 in accordance with various aspects described herein. As shown in FIG. 2G, the telemetry functionality of the cloud connection stack (218*y*) is implemented for execution by the device's processor(s) 212*p* and OS(s) 212*s*, the bootstrapping functionality of the cloud connection stack (218*b*) is included in the SIM component 214*i*, and the security transport stack (218*t*) is included in the modem 214. In some embodiments, the security transport stack (218*t*) may be executed in an OS 214*x* on an AP processor 214*r*. In alternate embodiments, the security transport stack (218*t*) may be executed in an OS 214*y* on a cellular processor 214*u*.

Employing the cloud connection stack for telemetry reduces or eliminates a need for any special telemetry stacks in the OS(s) 212*s*. Furthermore, leveraging the SIM component 214*i* for bootstrapping reduces or eliminates a need for special bootstrapping stacks in the OS(s) 212*s*. Implementing the IoT device 210 as shown in FIG. 2G also allows for pre-bootstrapping of the IoT device 210 via the SIM component 214*i* prior to shipment to users (e.g., customers or end users). This reduces or eliminates a need for bootstrapping in the field, which can simplify IoT device deployment.

FIG. 2H is a flow diagram that illustrates an example messaging/telemetry process with respect to the IoT device architecture of FIG. 2G, in accordance with various aspects described herein. As shown in FIG. 2H (where messaging/telemetry is performed in the device processor(s) 212*p* and OS(s) 212*s* based on bootstrapping information stored in the SIM component 214*i*), the device may request for and obtain (204*a*, 204*b*, 204*c*, 204*d*) the server configuration information and the operational certificate stored in the SIM component 214*i* to initiate (204*e*) a (D)TLS session with the device management server 220*d*. The device may request for and obtain (204*f*, 204*g*, 204*i*, 204*j*) a (D)TLS session key from the SIM component 214*i* (the SIM component 214*i* may perform validation (204*h*) of the operational certificate) . A (D)TLS session may be established (204*k*) using the operational certificate and the session key. The device management server 220*d* may validate (204*l*) the operational certificate, after which loops of communications may occur. For instance, the device may send (204*m*) a message (e.g., via MQTT, LwM2M, CoAP, or the like) to the device management server 220*d* and receive (204*n*) a server message therefrom. The (D)TLS session may end (204*o*) when messaging/telemetry is complete.

In certain embodiments, the IoT device 210 may have an alternative configuration in which the telemetry functionality of the cloud connection stack is included in a modem, the bootstrapping functionality of the cloud connection stack is included in a SIM component, and the security transport stack is included in the modem. FIG. 2I is a block diagram illustrating an alternate example, non-limiting embodiment 200*e* of an IoT system functioning within, or operatively overlaid upon, the communications network 100 of FIG. 1 in accordance with various aspects described herein. As shown in FIG. 2I, the telemetry functionality of the cloud connection stack (218*y*) is included in the modem 214, the bootstrapping functionality of the cloud connection stack (218*b*) is included in the SIM component 214*i*, and the security transport stack (218*t*) is included in the modem 214. In some embodiments, the telemetry functionality of the cloud connection stack (218*y*) and/or the security transport stack (218*t*) may be executed in an OS 214*x* on an AP processor 214*r*. In alternate embodiments, the telemetry functionality of the cloud connection stack (218*y*) and/or the security transport stack (218*t*) may be executed in an OS 214*y* on a cellular processor 214*u*.

Employing the cloud connection stack for telemetry within the modem 214 reduces or eliminates a need for telemetry implementations in the OS(s) 212*s*. Furthermore, leveraging the SIM component 214*i* for bootstrapping reduces or eliminates a need for special bootstrapping stacks in the OS(s) 212*s*. Implementing the IoT device 210 as shown in FIG. 2I allows for pre-bootstrapping of the IoT device 210 via the SIM component 214*i* prior to shipment to users (e.g., customers or end users). This reduces or eliminates a need for bootstrapping in the field, which can simplify IoT device deployment.

FIGS. 2J and 2K are flow diagrams that respectively illustrate an example bootstrapping process and an example messaging/telemetry process with respect to the IoT device architecture of FIG. 2I, in accordance with various aspects described herein. Referring to FIG. 2J (where bootstrapping is performed by the SIM component 214*i*), the SIM component 214*i* may retrieve (205*a*) a SIM ICCID, bootstrap certificates, etc. and initiate (205*b*) a (D)TLS session with the bootstrap server 220*b*. The SIM component 214*i* may retrieve (205*c*) a (D)TLS session key. The SIM component 214*i* and the bootstrap server 220*b* may perform mutual authentication (205*d*), where the SIM component 214*i* may validate server certificates (205*e*) and the bootstrap server 220*b* may validate the bootstrap certificates (205*f*), resulting in an established (D)TLS session (205*g*). The SIM component 214*i* may then request (205*h*) and obtain (205*i*) server configuration information (e.g., including a device management server URL) from the bootstrap server 220*b*, and subsequently store (205*j*) the server configuration information. The SIM component 214*i* may generate and send (205*k*, 205*l*) a CSR to the bootstrap server 220*b*, which may create an operational certificate using the CSR for the SIM component 214*i* (205*m*). The (D)TLS session may then end (205*n*) and the operational certificate may be stored (205*o*) in the SIM component 214*i*.

Referring to FIG. 2K (where messaging/telemetry is performed by the modem 214 based on bootstrapping information in the SIM component 214*i*), the device may (optionally) send a message request (206*a*) to the modem 214. The modem 214 may request for (206*b*) and obtain (206*c*) the server configuration information and the operational certificate from the SIM component 214*i* (i.e., previously stored from bootstrapping per FIG. 2J above). The modem 214 may use (206*d*) the server configuration information and the operational certificate to initiate (206*d*) a (D)TLS session with the device management server 220*d*. The modem 214 may request (206*e*) and obtain (206*h*) a (D)TLS session key from the SIM component 214*i* (which may involve the SIM component 214*i* performing validation (206*f*) of the operational certificate and the device management server 220*d* performing validation (206*g*) of the operational certificate).

A (D)TLS session may be established (206*i*) using the operational certificate and the session key, after which optional loops of communications may occur. For instance, the device may send a message request (206*j*) to the modem 214; the modem 214 may send (206*k*) a message (e.g., via MQTT, LwM2M, CoAP, or the like) to the device management server 220*d* and receive (206*l*) a server message therefrom; the modem 214 may forward (206*m*) a message to the device; and/or the device may query (206*n*) the modem 214 for a received message and receive (206*o*) a received message from the modem 214. The (D)TLS session may end (206*p*) when messaging/telemetry is complete.

In certain embodiments, an IoT device may have an alternate configuration in which the IoT application itself, a cloud connection stack, and a security transport stack are all implemented in the modem and executed by AP processor(s) in corresponding OS(s). FIG. 2O is a block diagram illustrating an alternate example, non-limiting embodiment 200*f* of an IoT system functioning within, or operatively overlaid upon, the communications network 100 of FIG. 1 in accordance with various aspects described herein. As shown in FIG. 2O, an IoT application 212*a'*, the cloud connection stack 218*c*, and the security transport stack 218*t* are all implemented in the modem 214 and executed by AP processor(s) 214*r'* in corresponding OS(s) 214*x'*. Here, the security transport stack 218*t* may interact with a modem security stack 214*t'* that is executed in OS(s) 214*y'* on cellular processor(s) 214*u'*. The modem security stack 214*t'* may interact with SIM component(s) 214*i'* via a SIM driver 214*v'*. In some embodiments, the modem security stack 214*t'* may help simplify cloud connections and may include fewer transport protocol options and security options than the security transport stack 218*t*.

Employing the application and the security transport stack in the modem (or by "moving" the application and the security transport stack from a device processor/OS to the modem's AP processor/OS) reduces or eliminates a need for the device processor/OS, which simplifies the IoT device and reduces costs as well as overall power consumption. Here, the modem can fully support both the application and the security transport stack, and thus the IoT device can be said to be "plug and play" with the modem, where the bare minimal—e.g., the modem's processing/OS resources—is sufficient to realize the IoT device. This also obviates a need for IoT device developers to manage cloud connection protocols and develop special security/transport stacks and also allows for flexible changing/selection of cloud providers/systems. Implementing the IoT device 210' as shown in FIG. 2O further allows for pre-bootstrapping of the IoT device 210' via the modem 214' prior to shipment to users (e.g., customers or end users), which reduces or eliminates a need for bootstrapping in the field, thereby simplifying IoT device deployment.

It is to be understood and appreciated that the quantity and arrangement of devices, processors, OSs, stacks, drivers, adapters, components, servers, and/or networks shown in FIGS. 2A-2O are provided as an example. In practice, there may be additional devices, processors, OSs, stacks, drivers, adapters, components, servers, and/or networks, fewer devices, processors, OSs, stacks, drivers, adapters, components, servers, and/or networks, different devices, processors, OSs, stacks, drivers, adapters, components, servers, and/or networks, or differently arranged devices, processors, OSs, stacks, drivers, adapters, components, servers, and/or networks than those shown in FIGS. 2A-2O. For example, the various system implementations can include more or fewer devices, processors, OSs, stacks, drivers, adapters, components, servers, and/or networks, etc. In practice, therefore, there can be hundreds, thousands, millions, billions, etc. of such devices, processors, OSs, stacks, drivers, adapters, components, servers, and/or networks. In this way, example systems can coordinate, or operate in conjunction with, a set of devices, processors, OSs, stacks, drivers, adapters, components, servers, and/or networks and/or operate on data sets that cannot be managed manually or objectively by a human actor. Furthermore, two or more devices, processors, OSs, stacks, drivers, adapters, components, servers, or networks shown in one or more of FIGS. 2A-2O may be implemented within a single device, processor, OS, stack, driver, adapter, component, server, or network, or a single device, processor, OS, stack, driver, adapter, component, server, or network shown in one or more of FIGS. 2A-2O may be implemented as multiple devices, processors, OSs, stacks, drivers, adapters, components, servers, or networks. Additionally, or alternatively, a set of devices, processors, OSs, stacks, drivers, adapters, components, servers, or networks shown may perform one or more functions described as being performed by another set of devices, processors, OSs, stacks, drivers, adapters, components, servers, or networks.

It is also to be understood and appreciated that, although one or more of FIGS. 2A-2O are described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 3:
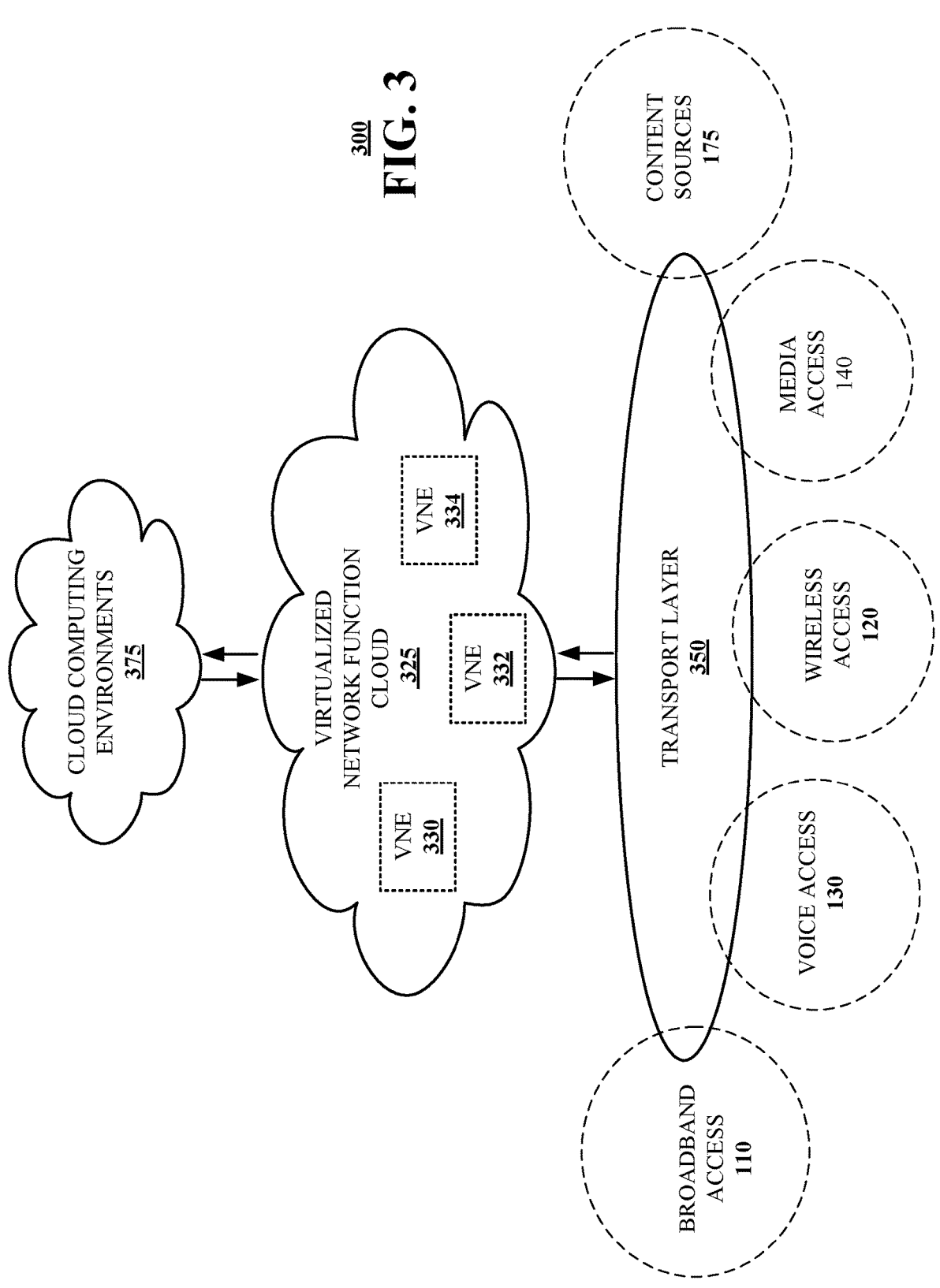
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100 and/or some or all of the subsystems and functions shown in FIGS. 2A-2O. For example, virtualized communications network 300 can facilitate, in whole or in part, IoT SAFE device to cloud integration.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is clastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
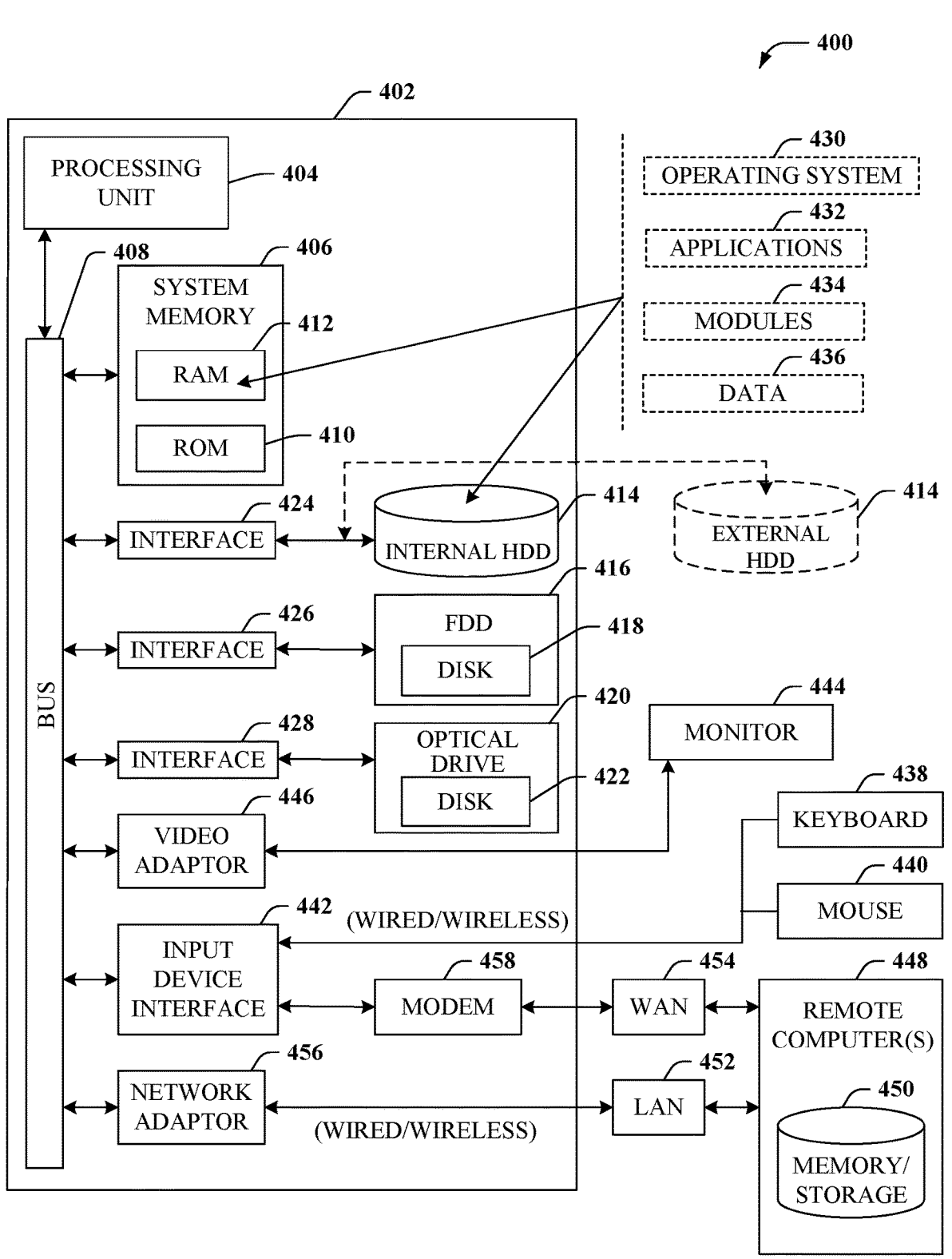
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, IoT SAFE device to cloud integration.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
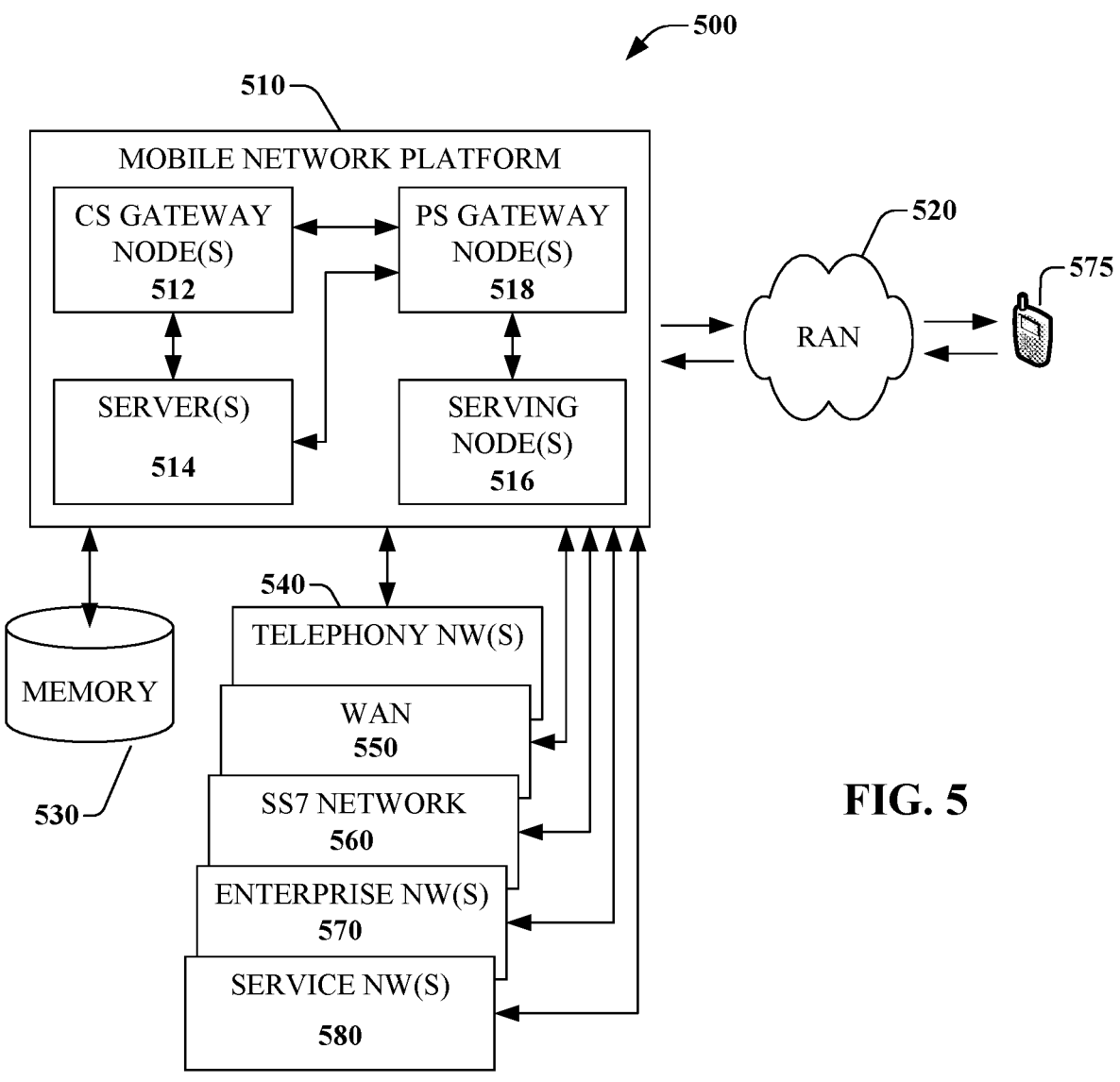
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, IoT SAFE device to cloud integration. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
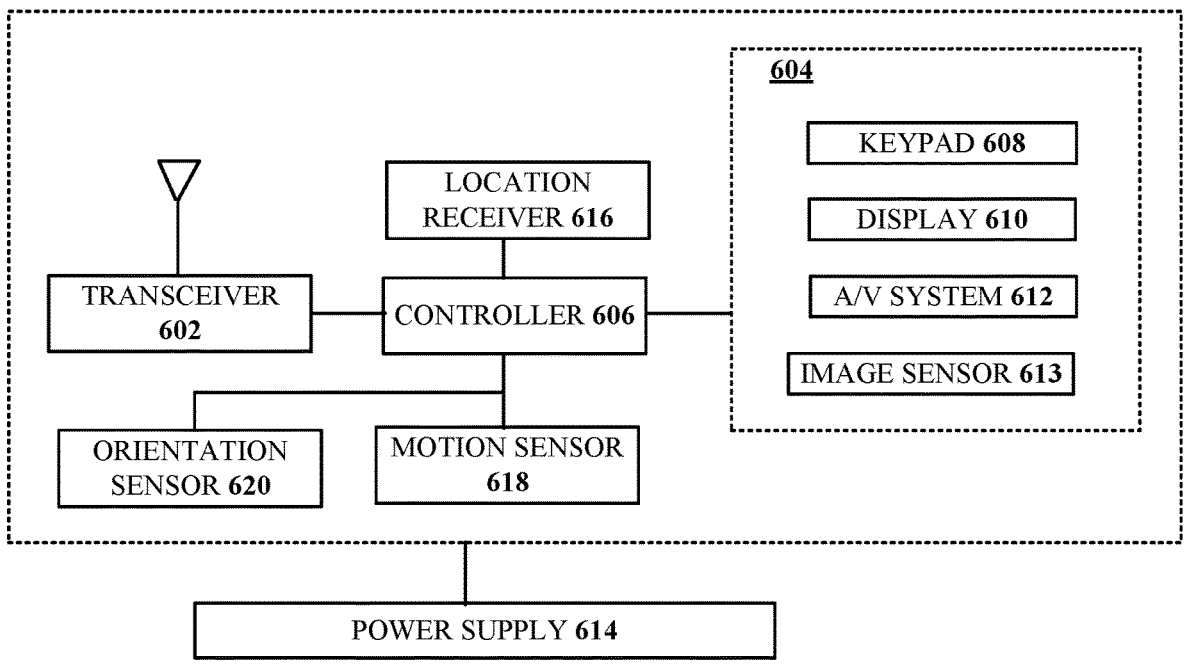
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, IoT SAFE device to cloud integration.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a device processing system and a device operating system (OS) that runs on the device processing system;
a cellular modem communicatively coupled to the device processing system, and equipped with a cellular processing system and a cellular OS that runs on the cellular processing system; and
a subscriber identity module (SIM) component communicatively coupled to the cellular modem,
wherein the device is configured with a modem security transport stack and a cloud connection stack, and
wherein the modem security transport stack is executed in the cellular OS on the cellular processing system.

2. The device of claim 1, wherein the modem security transport stack includes one or more rules, protocols, interfaces, or technologies for an application layer, a session layer, a transport layer, or a combination thereof.

3. The device of claim 1, wherein the modem security transport stack comprises Message Queuing Telemetry Transport (MQTT), Constrained Application Protocol (CoAP), Lightweight Machine-to-Machine (LwM2M), Transport Layer Security (TLS), Datagram Transport Layer Security (DTLS), Transmission Control Protocol (TCP)/ Internet Protocol (IP), User Datagram Protocol (UDP), Hypertext Transfer Protocol (HTTP), HTTP Secure (HTTPS), or a combination thereof.

4. The device of claim 1, wherein a device transport stack is executed in the device OS on the device processing system, and wherein the device further comprises a modem stack adapter configured to translate or transform protocols between the modem security transport stack and the device transport stack.

5. The device of claim 1, wherein the cloud connection stack includes one or more rules, protocols, interfaces, or technologies for an application layer.

6. The device of claim 1, wherein the cloud connection stack relates to bootstrapping, telemetry, or a combination thereof.

7. The device of claim 1, wherein the cloud connection stack comprises Message Queuing Telemetry Transport (MQTT), Constrained Application Protocol (CoAP), Hypertext Transfer Protocol (HTTP), HTTP Secure (HTTPS), Lightweight Machine-to-Machine (LwM2M), or a combination thereof.

8. The device of claim 1, wherein the cloud connection stack is executed in the device OS on the device processing system.

9. The device of claim 1, wherein the cloud connection stack is executed in the cellular OS on the cellular processing system.

10. The device of claim 1, wherein telemetry functionality of the cloud connection stack is executed in the device OS on the device processing system, and wherein bootstrapping functionality of the cloud connection stack is executed in the cellular OS on the cellular processing system.

11. The device of claim 1, wherein telemetry functionality of the cloud connection stack is executed in the device OS on the device processing system, and wherein bootstrapping functionality of the cloud connection stack is executed in the SIM component.

12. The device of claim 1, wherein telemetry functionality of the cloud connection stack is executed in the cellular OS on the cellular processing system, and wherein bootstrapping functionality of the cloud connection stack is executed in the SIM component.

13. The device of claim 1, wherein telemetry functionality and bootstrapping functionality of the cloud connection stack are executed in the SIM component.

14. The device of claim 1, wherein the device comprises an Internet-of-Things (IoT) device or a non-IoT device.

15. The device of claim 1, wherein the SIM component comprises a SIM card, an embedded SIM (eSIM), or an integrated SIM (iSIM).

16. The device of claim 1, wherein the device is compliant with or exceeds requirements of Internet-of-Things (IoT) SIM Applet For Secure End-2-End Communication (SAFE).

17. The device of claim 1, wherein the cellular processing system is configured to communicate with a cellular network.

18. The device of claim 1, wherein each of the modem security transport stack and the cloud connection stack is capable of being updated via Over the Air (OTA), via application programming interface (API) calls, or both.

19. An apparatus configured to facilitate an Internet-of-Things (IoT) application, the apparatus comprising:

a modem that includes an application (AP) processing system and an AP operating system (OS) that runs on the AP processing system; and a subscriber identity module (SIM) component communicatively coupled to the modem, wherein an application stack, a modem security transport stack, and a cloud connection stack are executed in the AP OS on the AP processing system, thereby reducing a need for an apparatus OS and an apparatus processing system that are external to the modem.

20. A method, comprising:

configuring an Internet-of-Things (IoT) device with a modem security transport stack, wherein the IoT device includes a device operating system (OS) that runs on a device processing system, a cellular OS that runs on a cellular processing system, and a subscriber identity module (SIM) component, wherein the modem security transport stack is executed in the cellular OS on the cellular processing system, and wherein a device transport stack is executed in the device OS on the device processing system; and providing the IoT device with a modem stack adapter that is configured to facilitate conversion of protocols between the modem security transport stack and the device transport stack.

\* \* \* \* \*